United States Patent [19]

Ikeda

[11] Patent Number: 5,650,883

[45] Date of Patent: Jul. 22, 1997

[54] DATA RECORDING APPARATUS HAVING CHECK-AFTER-WRITE FUNCTION AND REPRODUCTION APPARATUS AND METHOD FOR REPRODUCING DATA RECORDED BY THE RECORDING APPARATUS

[75] Inventor: Katsumi Ikeda, Kanagawa, Japan

[73] Assignee: Sony Corporation, Tokyo, Japan

[21] Appl. No.: 541,725

[22] Filed: Oct. 10, 1995

[30] Foreign Application Priority Data

Oct. 14, 1994 [JP] Japan .................................. 6-274339

[51] Int. Cl.$^6$ .............................. G11B 5/09; G11B 27/36; G11B 5/02
[52] U.S. Cl. .................................. 360/53; 360/31; 360/27
[58] Field of Search ............................ 360/53, 31, 27

[56] References Cited

U.S. PATENT DOCUMENTS 5,339,205  8/1994  Sudoh et al. ........................ 360/53

Primary Examiner—W. C. Kim
Attorney, Agent, or Firm—Jay H. Maioli

[57] ABSTRACT

A recording apparatus has a check-after-write function for reproducing and checking the recorded state of a recorded track. When overwriting of data is started, an identification number to be stored in a track is set at a fixed value, and check-after-reproduction is performed by the fixed value during reproduction in which a check is made. Also, a reproducing apparatus includes a system for detecting that a very small error segment has occurred on the data and for making the data of the error segment invalid or not outputting the data when it is determined that the error segment has occurred.

13 Claims, 18 Drawing Sheets

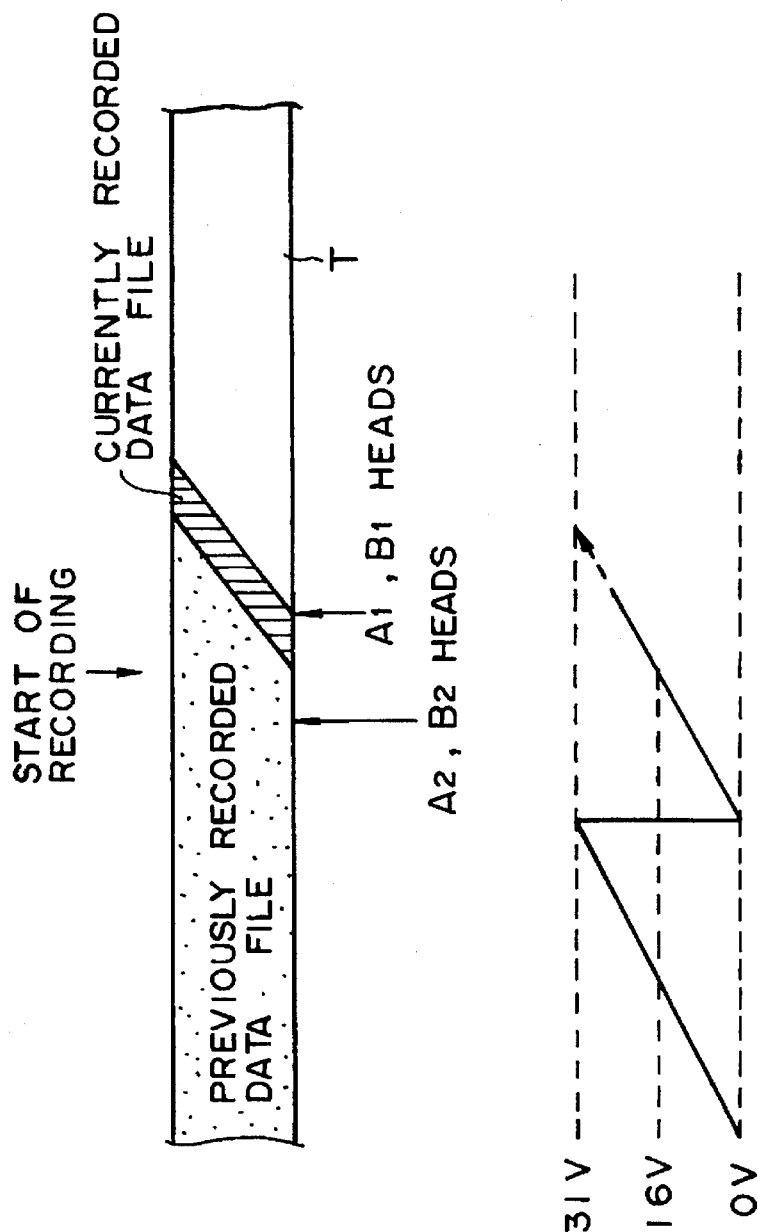

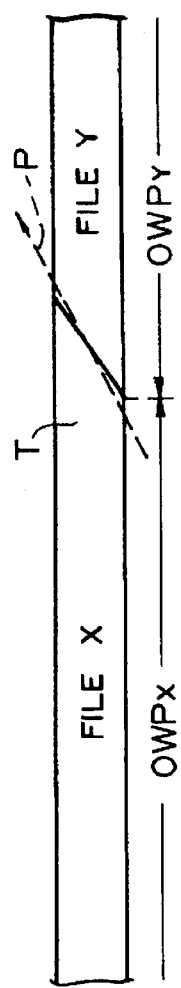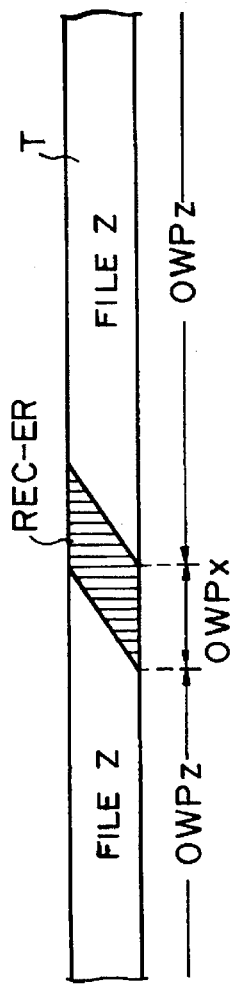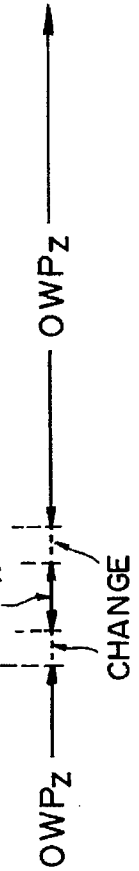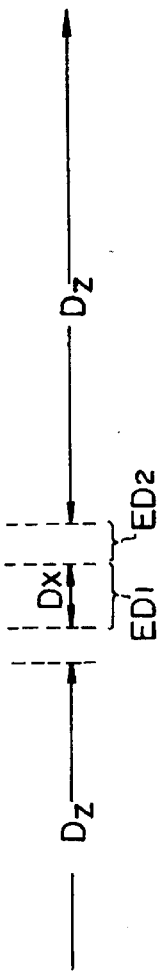
FIG. 4A
FIG. 4B OVERWRITING OF FILE Z
FIG. 4C READOUT DATA
FIG. 4D READOUT OWP
FIG. 4E REFERENCE OWP
FIG. 4F VALID REPRODUCTION OUTPUT

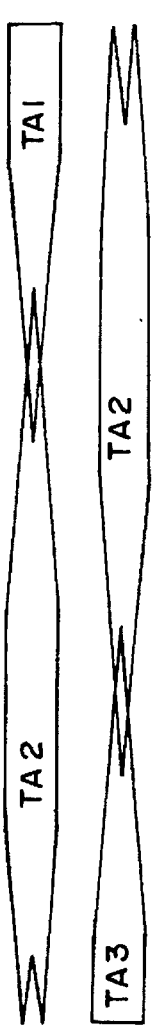
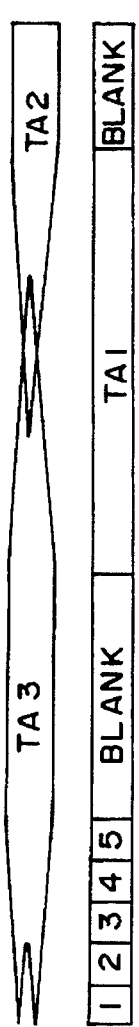
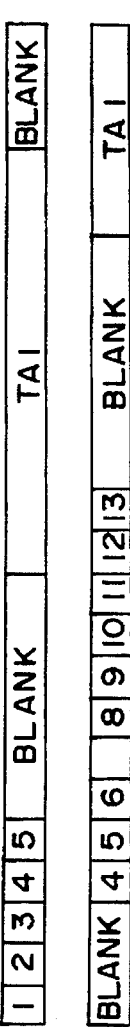
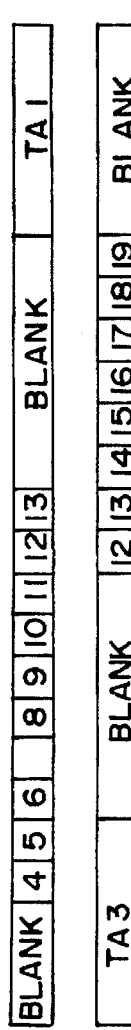
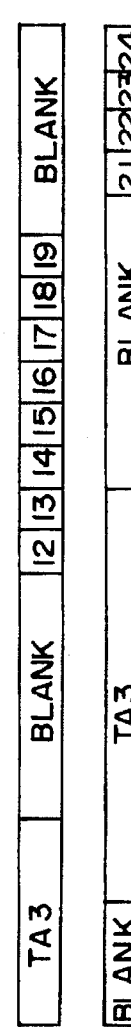
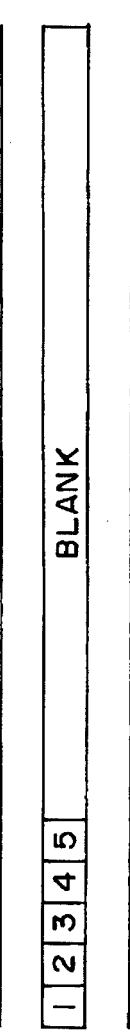
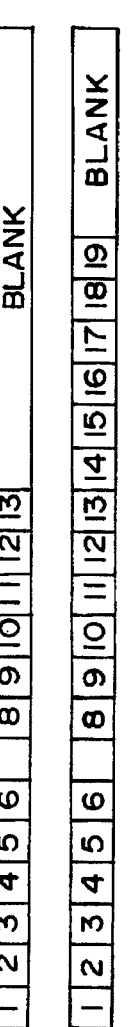
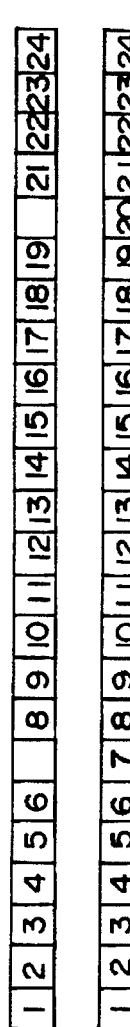
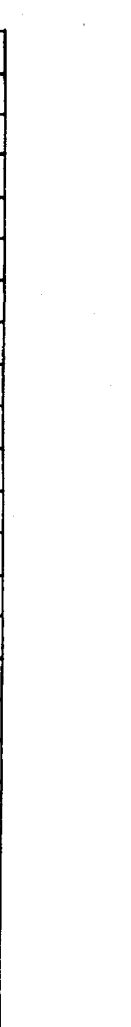

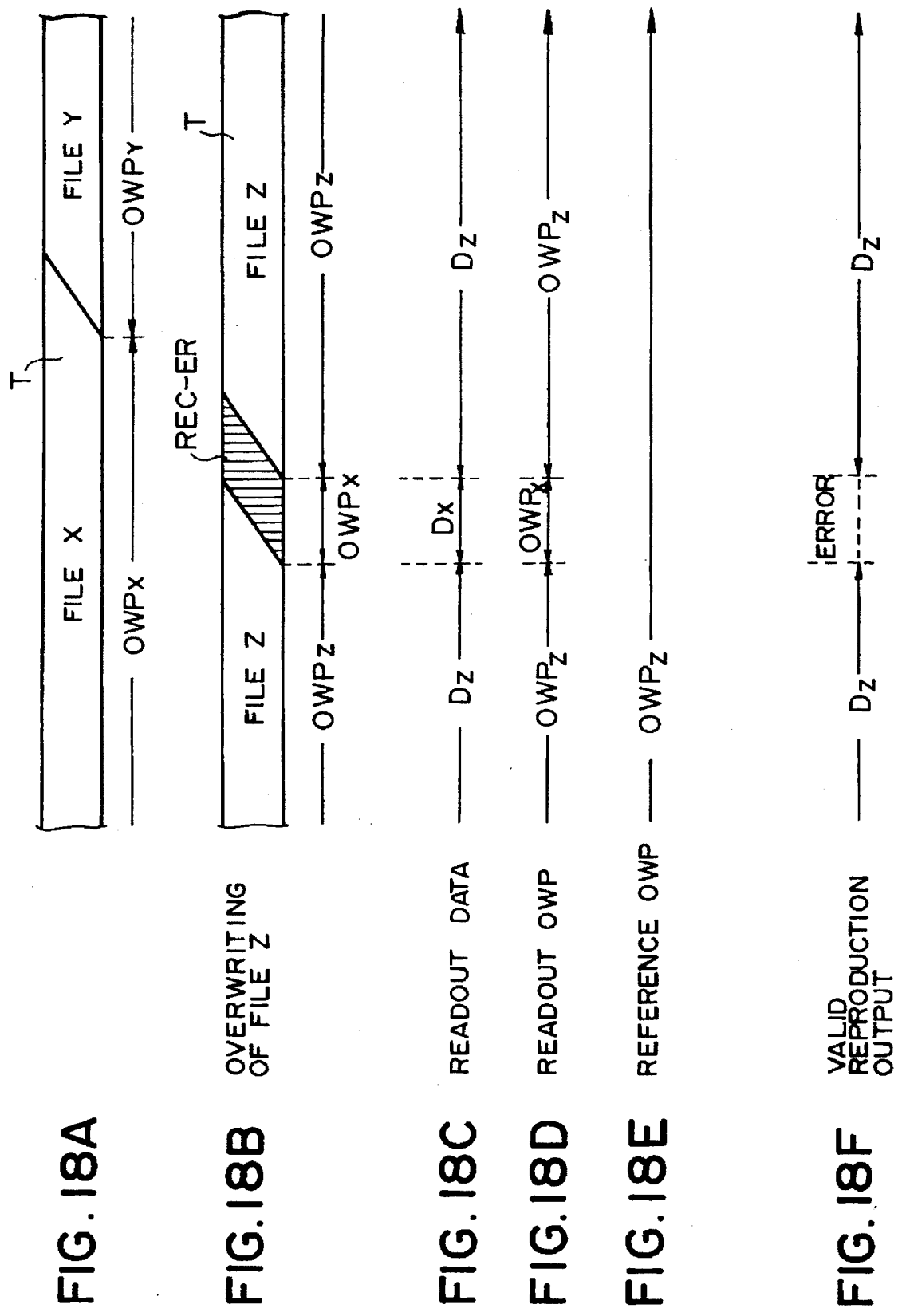

DATA RECORDING APPARATUS HAVING CHECK-AFTER-WRITE FUNCTION AND REPRODUCTION APPARATUS AND METHOD FOR REPRODUCING DATA RECORDED BY THE RECORDING APPARATUS

BACKGROUND OF THE INVENTION

1. Field of the Invention

The present invention relates to a data and reproduction apparatus which is called a data streamer.

2. Description of the Related Art

In a data recording method employing a magnetic tape as a recording medium, what is commonly called a non-tracking method is known.

As shown in FIG. 1, a magnetic tape T is wound around a rotating head, and tracks TK are formed obliquely with respect to the direction of the movement of tape. The non-tracking method is designed so that, by performing scanning at a density higher than that during reproduction as indicated by a solid line Pa and a dotted line Pb, all data on the tracks TK can be read without accurately tracing on the tracks, and by rearranging the read-in data by using the address recorded together with the data, a reproduction data stream can be reconstructed accurately.

FIG. 2 shows the structure of the tracks TK on a magnetic tape in the non-tracking method.

As shown in FIG. 2, one track is made up of 108 blocks, and one block is composed of 288 bits.

The 92 blocks in the central portion of the track are made to be a main data area, and an inner double recording area of 9 blocks and an outer double recording area of 7 blocks are formed on both sides of the main data area.

In the inner double recording area, data having the same content as that of the block in the main data area spaced 92 blocks away in the outward direction from the position of the inner double recording area is recorded. In the outer double recording area, data having the same content as that of the block in the main data area spaced 92 blocks away in the inward direction from the position of the inner double recording area is recorded. In other words, as shown in FIG. 2, data having the same contents as that of the leading 7 blocks (the shaded portion) of a data area 1 is recorded in the outer double recording area at a different address, and data having the same contents as that of the trailing 9 blocks (the dotted-line portion) of the data area 1 is recorded in the inner double recording area at a different address. Therefore, even if the touch position of the head is deviated due to fluctuation of tape, the data is designed to compliment each other. That is, blocks (data contents) which cannot be read, in particular, at the leading and trailing ends, will not occur for the data in the form of blocks which are recorded within the main data area.

The two central blocks of the main data area are allocated to an area for subcodes (AUX), each one block on both sides thereof is allocated to an area for IBG (Inter-Block Gap), and each four blocks on both sides thereof are allocated to an area for control codes (CTL). Further, on both sides thereof, data areas of 40 blocks are formed.

The signal format within one block is as shown in FIG. 2. The leading 11 bits are made to be a sync pattern, and an address ADRS is recorded by the subsequent 13 bits. The address ADRS is made up of a track address of 6 bits and a block address of 7 bits. Since a track address and a block address are recorded in each block in this manner, it is possible to reconstruct a data stream in an appropriate block sequence during reproduction.

In the case of a non-tracking method, since tracks TK are not always traced accurately, all blocks can be read out for each track by performing high-density scanning as shown in FIG. 1. In this case, however, the reading sequence of each block is random. The read block data is temporarily stored in a RAM. At this time, a writing address is created by using the track address and the block address in the RAM, and each block of data is written. Therefore, at the stage where all the blocks are read for a certain track, all the data of that track is arranged in the RAM. Therefore, if block data is read out in sequence from the RAM, an appropriate data stream is reconstructed.

Following the address ADRS, P and Q parities ($P_{OD}$, $Q_{OD}$, $P_{EV}$, $Q_{EV}$) each comprising 4 words are each recorded by 12 bits per word. Following the parity words, data comprising 16 words ($DT_1$ to $DT_{16}$) are each recorded by 12 bits per word. Following the 16-word data ($DT_1$ to $DT_{16}$), two CRCs (Cyclic Redundancy Check Codes) words are each recorded by 12 bits per word. An overwrite protect code (hereinafter referred to as an "OWP code") is recorded in the CRC word.

In the non-tracking method, since a deviation of a recording area is allowed, old data might be left without being erased near both ends of the track. Also, there might occur unerased portions which are not erased at overwrite time due to omission during recording or the clogging of the head. Since such unerased data is safe in terms of CRC during reproduction, the data is incorrectly recognized as correct data. Therefore, an OWP code is recorded as a code which is updated at each pause in the recording operation.

During reproduction, an OWP code is extracted from each block read out for a track to be scanned for reproduction, and a reference OWP code is set by a majority decision. In a case where an unerased portion has occurred in a certain portion within one track, the OWP code extracted from the unerased block is different from the OWP code which is extracted from the overwritten block. Therefore, when a track is reproduced, most correctly overwritten blocks can be read even if there is a partially unerased portion. Therefore, by deciding an OWP code by majority, the OWP code at the majority side can be determined as an OWP code set when it is correctly overwritten.

The above-mentioned OWP code is set as a reference OWP code. Thereafter, during reproduction for the series of records, data of the block having a different OWP code is determined to be unerased data, and the data can be nullified. Thus, it is possible to prevent erroneous data from being output.

The OWP code is recorded after Exclusive-OR is computed with the CRC of 24 bits in which the same two words are arranged. Therefore, during reproduction, it is possible to reconstruct the OWP code by computing Exclusive-OR with the CRC created from the reproduced data.

When recording data, such as computer programs, on a magnetic tape is taken into consideration, omission of data and recording of erroneous data during recording must be avoided. For this reason, the recorded data is checked after the data is recorded (check-after-write).

For this check, as heads to be disposed, for example, in a rotating drum, heads $A_1$ and $B_1$ are disposed, and heads $A_2$ and $B_2$ are disposed at positions oppositely facing the heads $A_1$ and $B_1$ by 180°. Data is recorded in the form of tracks by the heads $A_1$ and $B_1$, and the data of the recorded tracks is reproduced by the heads $A_2$ and $B_2$ so that a check is made to determine if the data has been correctly recorded. The heads $A_2$ and $B_2$ trace the recorded tracks with a difference of several tracks with respect to the heads $A_1$ and $B_1$.

Here, when recording by the heads $A_1$ and $B_1$, the track address (ADA-V) is of a repeat value of 0 to 31, and the track address is incremented per one rotation of the drum, and is recorded in the address ADRS of each block of FIG. 2.

When, for example, there is a previously recorded data file on the tape T as shown in FIG. 3A, track address (ADA-V) 0 to 31 shown in FIG. 3B is repeatedly recorded for each track constituting the data file. The track address (ADA-V) also serves as an address of RAM for temporarily storing data during recording and reproduction as described above. When the RAM has a capacity for 32 tracks, a value from 0 to 31 is set in the track address (ADA-V).

It is now assumed that, for example, following the previously recorded data file, a new data file is begun to be recorded from the position indicating the start of recording as shown in FIG. 3A. If it is assumed that the track address (ADA-V) of the final track is sixteen when recording of the previously recorded data file stopped, a new data file is begun to be recorded starting at the track address (ADA-V) of 17. Then, the track address (ADA-V) is updated as 18, 19, ..., 31, 0, 1 for each track.

In a case where recording by the heads $A_1$ and $B_1$ starts, the heads $A_2$ and $B_2$ which trace with a difference of several tracks will at first trace a previous data file. Therefore, the heads $A_2$ and $B_2$ trace data which is not related to the data of the track recorded by the heads $A_1$ and $B_1$, and thus the data read by the heads $A_2$ and $B_2$ is not necessary for checking data.

However, since, in practice, the point at which the tracks recorded for this time start cannot be determined from the reproduction data, a data check operation based on data read by the heads $A_2$ and $B_2$ must be also performed before the leading track on which recording is actually started as a data file for this time is reached. The data check operation for the previously recorded data tracks wastes electric power, and in some cases an improper check operation might be performed.

In a case where a series of data files are recorded on the magnetic tape T as described above, an OWP code is added; for example, for tracks which constitute file X as shown in FIG. 4A, an OWP code is recorded as $OWP_x$ in each block. Also, for tracks which constitute file Y, an OWP code is recorded as $OWP_y$ in each block.

When, for example, file X is reproduced, a reference OWP code is set in $OWP_x$, the reference OWP code is compared with the OWP code for each block. When the reference OWP code matches the majority reference OWP code, the block is assumed to be valid data. Even if reproduction scanning is performed in the direction indicated by the long dashed line P in FIG. 4A and the block of file Y is read in, the block is set as $OWP_y$ and $OWP_y$ is different from the reference OWP code $OWP_x$, and the block is not assumed to be valid data of file X. Thereafter, when the process proceeds to the reproduction of file Y, the reference OWP code is changed to $OWP_y$ because a greater number of OWP codes which become $OWP_y$ are read in, and the blocks of the file Y are assumed to be valid data.

It is now assumed that data file Z is overwritten on file X as shown in FIG. 4B and the OWP code in this case is $OWP_z$. It is assumed that, however, an unerased portion occurs due to some reason, such as the clogging of the head, and previous data of file X is partially left as indicated by the shaded portion REC-ER in FIG. 4B.

If this data is reproduced, regarding data read out by the reproducing head from the magnetic tape T, unerased data $D_x$ which constitutes file X is contained in the middle of data $D_z$ which constitutes file Z as shown in FIG. 4C. The OWP code of the block having data Dx is $OWP_x$ as shown in FIG. 4D. Since the reference OWP code which is set during reproduction as shown in FIG. 4E is set to $OWP_z$ at first, and it is compared with the OWP code ($OWP_z$) of the block having data $D_z$, data $D_z$ is made to be valid reproduction output when a code match occurs.

However, when the process proceeds to the reproduction of the unerased portion, a great number of $OWP_x$ is read out, the reference OWP code is updated to $OWP_x$ as shown in FIG. 4F. After the reference OWP code is changed, the unerased data Dx which is read out is processed as valid data. Since a great number of $OWP_z$ is read out again after the unerased portion is reproduced, the reference OWP code is set to $OWP_z$ again, and data $D_z$ which is read out is made to be valid reproduction output.

With the above-described operation, in the reproduction of file Z, unnecessary data might be made to be valid data in a period $ED_1$ as shown in FIG. 4F, and valid data which is read out in a period $ED_2$ might be omitted, causing a serious problem that the reliability is decreased.

SUMMARY OF THE INVENTION

In view of the above-described problems, an object of the present invention is to reduce consumption of electric power required by unnecessary operations and to improve the reliability of a data and reproduction apparatus.

In order to achieve the above-described object, according to one aspect of the present invention, there is provided a recording apparatus, comprising: a recording head for forming a plurality of tracks made up of a plurality of blocks on a magnetic tape and recording predetermined data therein, and for additionally recording a track number and a block number within the track; a reproducing head for reading data of the track formed by the recording means while a recording operation is being performed by the recording head; an error checker for determining whether data has been recorded correctly by the recording head on the basis of the data read by the reproducing head; and a controller for effecting control in such a way that the track number of the track on which recording starts is set at a fixed value before the recording starts and a recording operation is started, and a check operation by the error checker is started when it is determined that the track in which the data reproduced by the reproducing head is the predetermined fixed value has been reproduced.

According to another aspect of the present invention, there is provided a recording method employed in a recording apparatus in which a plurality of tracks made up of a plurality of blocks are formed in a magnetic recording medium, predetermined data is recorded therein, a track number and a block number within the track are recorded additionally, and data of the track formed by the recording head is read by a reproducing head, the predetermined data is checked, the recording method comprising: a step of setting the track number of the track on which recording starts at a predetermined fixed value when recording is started and starting a recording operation; a first determination step of determining that the track in which data reproduced by the reproducing head is set at the predetermined fixed value has been reproduced; and a second determination step of determining whether or not data has been recorded correctly when it is determined in the first determination step that the track which is set at the predetermined fixed value has been reproduced.

According to a further aspect of the present invention, there is provided a reproducing apparatus in which a plurality of tracks made up of a plurality of blocks are formed in a magnetic recording medium, predetermined data is recorded therein, the magnetic recording medium in which the identification data is recorded additionally in each block of the track is reproduced, the recording apparatus comprising: reference identification data setting means for setting the majority decision of identification data read out for each of the blocks during a predetermined period when the magnetic recording medium is reproduced at reference identification data; comparing means for comparing reference identification data set by the reference identification data setting means with identification data of each block reproduced thereafter; temporary reference identification data setting means for temporarily setting the majority identification data at reference identification data when it is determined by the comparing means that the reference identification data does not match the majority of identification data of each block reproduced during a predetermined period; determination means for determining that the majority of identification data reproduced has returned to the previous reference identification data after the reference identification data is temporarily set; and control means for effecting control in such a way that the reference identification signal which is temporarily set by the temporary reference identification data setting means is nullified when it is determined by the determination means that the majority of identification data reproduced after the reference identification data is changed has returned to the previous reference identification data.

According to still a further aspect of the present invention, there is provided a reproducing method in which a plurality of tracks made up of a plurality of blocks are formed in a magnetic recording medium and predetermined data is recorded therein, and the magnetic recording medium in which identification data is recorded additionally for each block of the tracks is reproduced, the recording method comprising: a reference identification data setting step of setting a majority of identification data read out from each of the blocks at reference identification data in a predetermined period when the magnetic recording medium is reproduced; a comparing step of comparing the set reference identification data with the identification data of each block which is reproduced thereafter; a temporary reference identification data setting step of temporarily setting the majority identification data at identification data when it is determined in the comparing step that the identification data do not match the majority of identification data of each block reproduced in the predetermined period; a determining step of determining if the majority of reproduced identification data has returned to the previous identification data after reference identification data is temporarily set in the temporary reference identification data setting step; and a step of controlling the reference identification signal which is temporarily set by the temporary reference identification data setting means to be nullified when it is determined in the determination step that the majority of identification data reproduced after the reference identification data is changed has returned to the previous reference identification data.

The above and further objects, aspects and novel features of the invention will more fully be appreciated from the following detailed description when read in connection with the accompanying drawings.

BRIEF DESCRIPTION OF THE DRAWINGS

FIG. 3A is a schematic view of a tape in a case where there is a previously recorded data file on the tape and a new data file is overwritten thereon;

FIG. 3B is a status transition view of a track address recorded on a tape;

FIG. 4A is an illustration of an OWP code when two files are recorded on a tape;

FIG. 4B is a schematic view in a case where there is a previously recorded data file on the tape, and an unerased error occurs when a new data file is overwritten thereon;

FIG. 4C is an illustration of readout data in FIG. 4B;

FIG. 4D is an illustration of readout OWP in FIG. 4B;

FIG. 4E is an illustration of a reference OWP in FIG. 4B;

FIG. 4F is an illustration of valid reproduction output data in FIG. 4B;

FIG. 14A is a timing chart illustrating the reproduction RF output of path 1 in FIG. 13 reproduced by the rotating head A1;

FIG. 14B is a timing chart illustrating the reproduction RF output of path 2 in FIG. 13 reproduced by the rotating head A1;

FIG. 14C is a timing chart illustrating the reproduction RF output of path 3 in FIG. 13 reproduced by the rotating head A1;

FIG. 14D is a timing chart illustrating the reproduction RF output of path 4 in FIG. 13 reproduced by the rotating head A1;

FIG. 14E is a timing chart illustrating the reproduction data block of path 1 in FIG. 13 reproduced by the rotating head A1;

FIG. 14F is a timing chart illustrating the reproduction data block of path 2 in FIG. 13 reproduced by the rotating head A1;

FIG. 14G is a timing chart illustrating the reproduction data block of path 3 in FIG. 13 reproduced by the rotating head A1;

FIG. 14H is a timing chart illustrating the reproduction data block of path 4 in FIG. 13 reproduced by the rotating head A1;

FIG. 14I is a timing chart of data recorded in a memory after reproduction of path 1 in FIG. 13 reproduced by the rotating head A1;

FIG. 14J is a timing chart of data recorded in the memory after reproduction of path 2 in FIG. 13 reproduced by the rotating head A1;

FIG. 14K is a timing chart of data recorded in the memory after reproduction of path 3 in FIG. 13 reproduced by the rotating head A1;

FIG. 14L is a timing chart of data recorded in the memory after reproduction of path 4 in FIG. 13 reproduced by the rotating head A1;

FIG. 14M is a timing chart of data recorded in the memory after reproduction from scanning 1 to 2 by the rotating head A2;

FIG. 18A is an illustration of an OWP code when two files are recorded on a tape;

FIG. 18B is a schematic view in a case where there is a previously recorded data file on the tape, and an unerased error occurs when a new data file is overwritten thereon;

FIG. 18C is an illustration of readout data in FIG. 18B;

FIG. 18D is an illustration of readout OWP in FIG. 18B;

FIG. 18E is an illustration of a reference OWP in FIG. 18B;

FIG. 18F is an illustration of valid reproduction output data in FIG. 18B; and

DETAILED DESCRIPTION OF THE PREFERRED EMBODIMENTS

Figure 5:
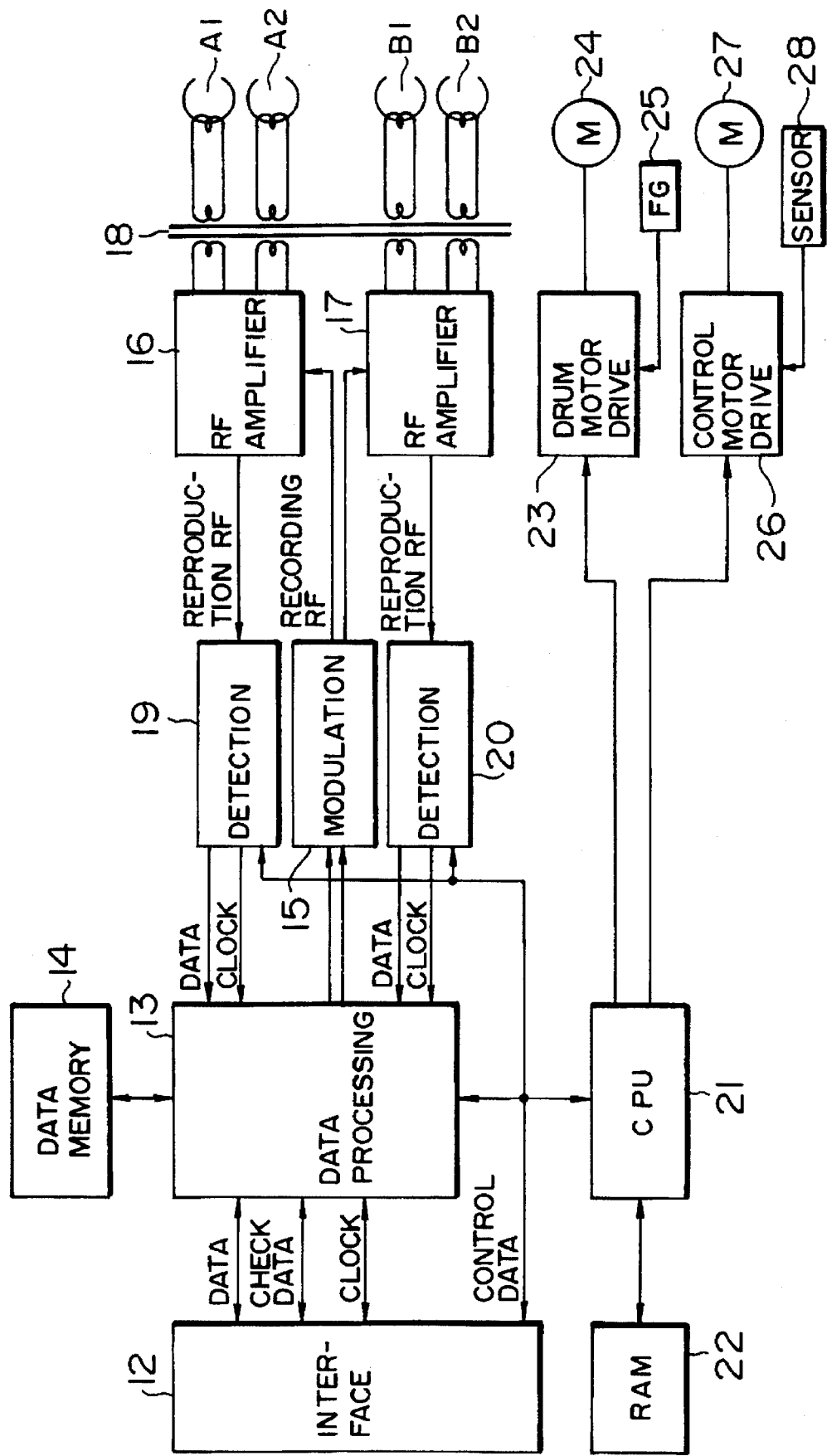
FIG. 5 is a block diagram of a data streamer of the present invention.
Figure 6:
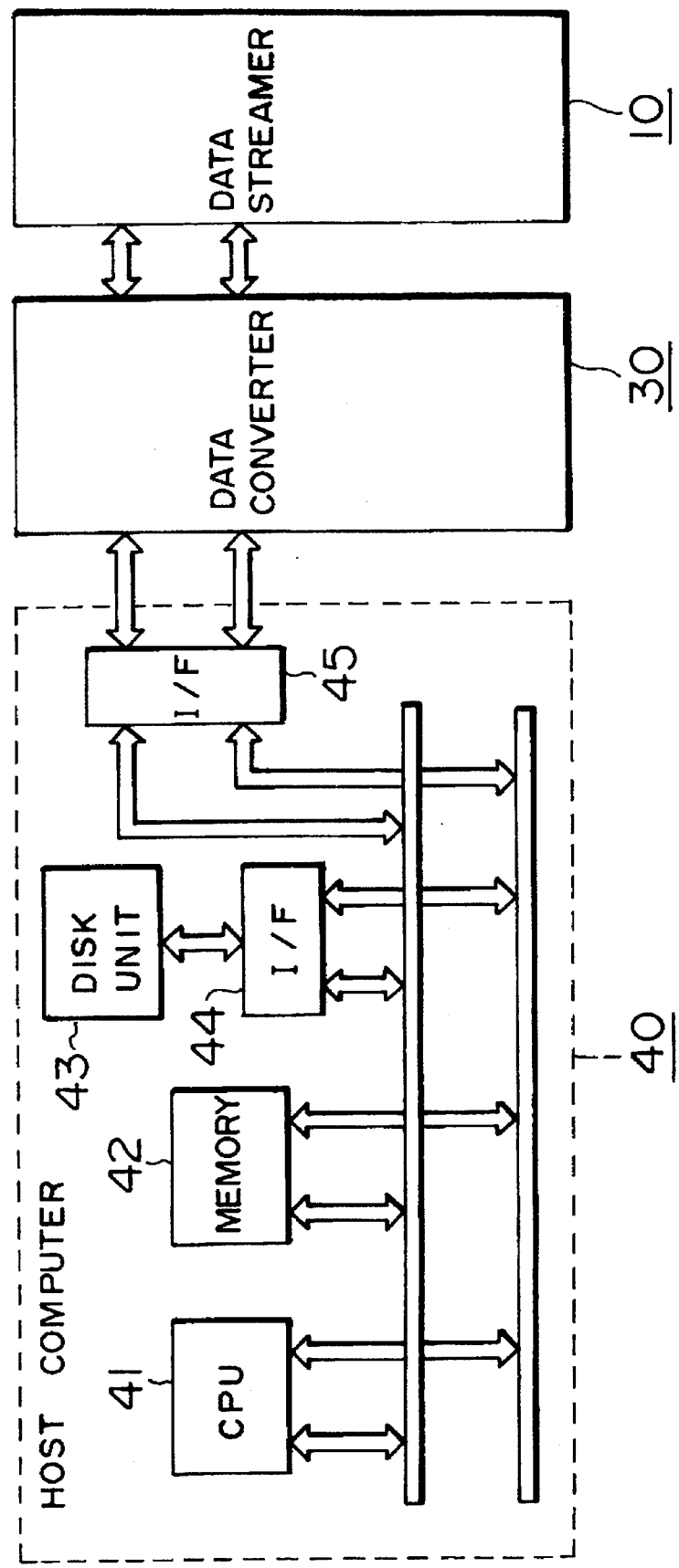
FIG. 6 is a block diagram of the entire system in which the data streamer is connected.

A recording and reproducing apparatus of an embodiment of the present invention will be described below. This recording and reproducing apparatus is called a data streamer for recording and reproducing data for a computer or the like by using a magnetic tape as a recording medium. The construction of the data streamer is shown in FIG. 5, and the construction of external apparatuses, such as a host computer, connected to this data streamer, is shown in FIG. 6.

First, the construction of the data streamer will be described with reference to FIG. 5.

Reference numeral 12 denotes an interface 12 for connection to external apparatuses, such as a computer, and for supplying data supplied to the interface 12 from outside to a data processing circuit 13.

A memory 14 for processing data is connected to the data processing circuit 13. The data processing circuit 13 converts data supplied from outside into data for recording, converts reproduction data into data for output, and divides data supplied from outside into a predetermined number of blocks and adds data for a block number and an error-correcting code to each block. The data processing circuit 13 operates under the control of a central processing unit (CPU) 21 which is a microcomputer for controlling the operation of each section of the streamer.

Recording data processed for recording by the data processing circuit 13 is modulated to recording signals by a modulating circuit 15. The recording signals are supplied to RF amplifiers 16 and 17 for each recording data for one track (data for one track is formed of a plurality of blocks). The magnetic heads A1 and A2 inside the rotating head drum (not shown) are connected to the RF amplifier 16 via a rotary transformer 18. The recording RF signals amplified by the RF amplifier 16 are supplied to the magnetic head A1 whereby the signals are recorded on the magnetic tape.

The magnetic heads B1 and B2 inside the rotating head drum are connected to the RF amplifier 17 via the rotary transformer 18. The recording RF signals amplified by the RF amplifier 17 are supplied to the magnetic head B1 whereby the signals are recorded on the magnetic tape.

The signals reproduced by the magnetic heads A1 and A2 are supplied to the RF amplifier 16 via the rotary transformer 18. The reproduced RF signals amplified by the RF amplifier 16 are detected by a detecting circuit 19, and the reproduced data and the clock components thereof are detected and supplied to the data processing circuit 13.

The signals reproduced by the magnetic heads B1 and B2 are supplied to the RF amplifier 17 via the rotary transformer 18. The reproduced RF signals by the RF amplifier 17 are detected by a detecting circuit 20, and the reproduced data and the clock components thereof are detected and supplied to the data processing circuit 13.

The data processing circuit 13 performs a synthesizing operation for reconstructing reproduced data to data for one track by using the data memory 14, and performs an error detection and error correction operation by using an error correcting code added to the reproduced data.

With the above operations, when data of each track becomes complete data, this data is supplied to the interface 12 together with a clock signal, and reproduced data is transmitted to the connected external apparatus.

In this embodiment, during recording in which the magnetic head A1 and the magnetic head B1 are used, the signals recorded by the magnetic head A2 and the magnetic head B2 are reproduced immediately after recording. In this case, error detection is performed for the reproduced data supplied to the data processing circuit 13 from each block by using a correcting code contained in this reproduced data. Data indicating the presence or absence of a detection error with address data for each block added thereto is supplied to an external apparatus through the interface 12.

A RAM 22 for storing control programs is connected to the CPU 21. In accordance with an instruction issued from the CPU 21, a motor 24 for the rotating head drum is driven to rotate at a predetermined speed under the control of a drum motor drive circuit 23. In this case, the rotating condition of the rotating head drum is detected by a frequency generator (FG) 25.

A control motor 27, mounted in the recording and reproducing apparatus, for winding a magnetic tape around the drum is driven by the control of a control motor drive circuit 26 in accordance with an instruction from the CPU 21. The condition in which the magnetic tape is wound is detected by a sensor 28.

Figure 7:
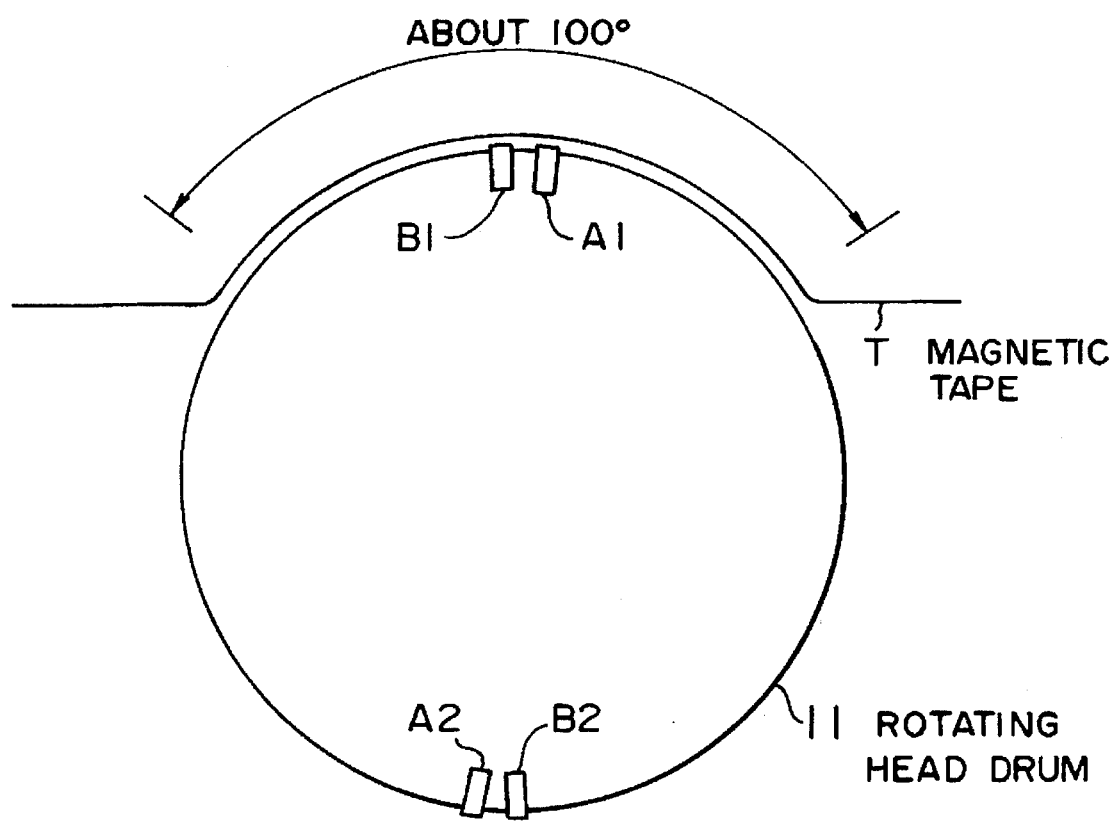
FIG. 7 is a schematic view of a rotating magnetic head and a tape wound around the rotating magnetic head.

The arrangement of the magnetic head of the rotating head drum of this embodiment is shown in FIG. 7. Referring to FIG. 7, reference numeral 11 denotes a rotating head drum, with a magnetic head A1 and a magnetic head B1 being disposed closely to each other at predetermined places on the rotating head drum 11. In this case, the azimuth angles of the magnetic heads A1 and B1 are made different from each other, and the mounting heights of the magnetic heads A1 and B1 on the head drum 11 are made different by one track. The magnetic heads A1 and B1 are heads serving for both recording and reproduction.

Two magnetic heads A2 and B2 are disposed on the head drum 11 to at a position away by 180° in the rotational angle with respect to the magnetic heads A1 and B1. The azimuth angles of the magnetic heads A2 and B2 are made different from each other. The magnetic heads A1 and A2 form one azimuth angle, and the magnetic heads B1 and B2 form another azimuth angle. The mounting heights of the magnetic heads A2 and B2 on the head drum 11 are made different by one track.

The mounting height of one of the sets, the magnetic heads A1 and B1, is displaced by several tracks (in this example, this is assumed to be 6 tracks) from that of the other set, the magnetic heads A2 and B2. The magnetic tape T is wound around the rotating head drum 1 in a wrap angle range of about 100°.

Figure 8:
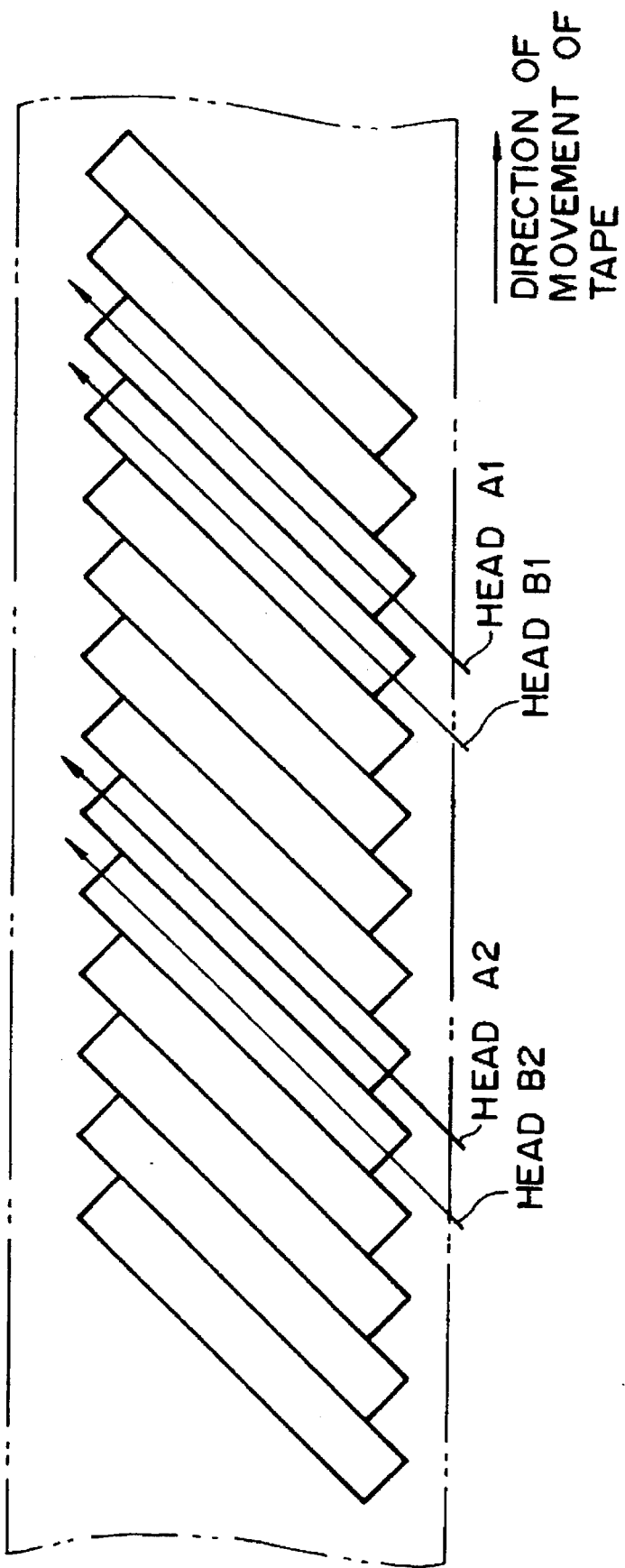
FIG. 8 is a schematic view illustrating a state in which the rotating magnetic head traces the tape.

With the arrangement of the four magnetic heads as described above, when one rotation of the rotating head drum 11 is made, scanning shown in FIG. 8 is performed by each magnetic head. That is, when the rotating head drum 11 makes one rotation and the magnetic head A1 scans the tracks by the path indicated by A1, for the magnetic head B1, a path B1 is obtained at which the adjacent tracks delayed by one track with respect to the direction of the movement of the tape are scanned; the path A2 of the magnetic head A2 is a path delayed by 6 tracks from the path A1 of the magnetic head A1; and the path B2 of the magnetic head B2 is a path delayed by 6 tracks from the path B1 of the magnetic head B1.

In this embodiment, a system is used in which a magnetic tape can be used in either direction. That is, when the tape is loaded with the obverse surface of the cassette having the magnetic tape loaded therein facing upward, recording and reproduction on and from the upper step of the magnetic tape in one direction can be performed, and when the tape is loaded with the reverse surface of the cassette having the magnetic tape loaded therein facing upward, recording and reproduction on and from the lower step of the magnetic tape in the other direction can be performed. In the example shown in FIG. 8, as a tape pattern, only recording and reproduction patterns in one direction are shown.

Since a non-tracking method is used in this embodiment, tracking control such that the scanning path of the magnetic head is made to coincide with the recording tracks during reproduction is not performed.

Next, the construction of an external apparatus connected to the data streamer having such a construction is shown in FIG. 6. Reference numeral 10 denotes the entire data streamer shown in FIG. 5, which is connected to a host computer 40 via a data converter 30.

The host computer 40 comprises a central processing unit 41, which is the main processing section, a memory 42 for storing data used for processing, and a disk unit 43, which is a large-capacity data storing section employing a hard disk. The disk unit 43 is connected to a bus line for exchanging data with each section via an interface 44.

The above-mentioned bus lines are available as a bus line for data and as a bus line for transmitting address data of the data to be transmitted. An interface 45 for connection with the data converter 30 is connected to the above-mentioned bus lines.

Data sent out from the interface 45 of the host computer 40 to the data converter 30 is converted by the data converter 30 into data in a form which can be received by the data streamer 10, and transmitted to the interface 12 within the data streamer 10. The data sent out from the interface 12 of the data streamer 10 is converted by the data converter 30 into data in a form which can be received by the host computer 40, and transmitted to the interface 44 within the host computer 40.

Next, a description will be given of an operation of recording data supplied from the host computer 40 on a magnetic tape by using the data streamer of this embodiment.

Figure 9:
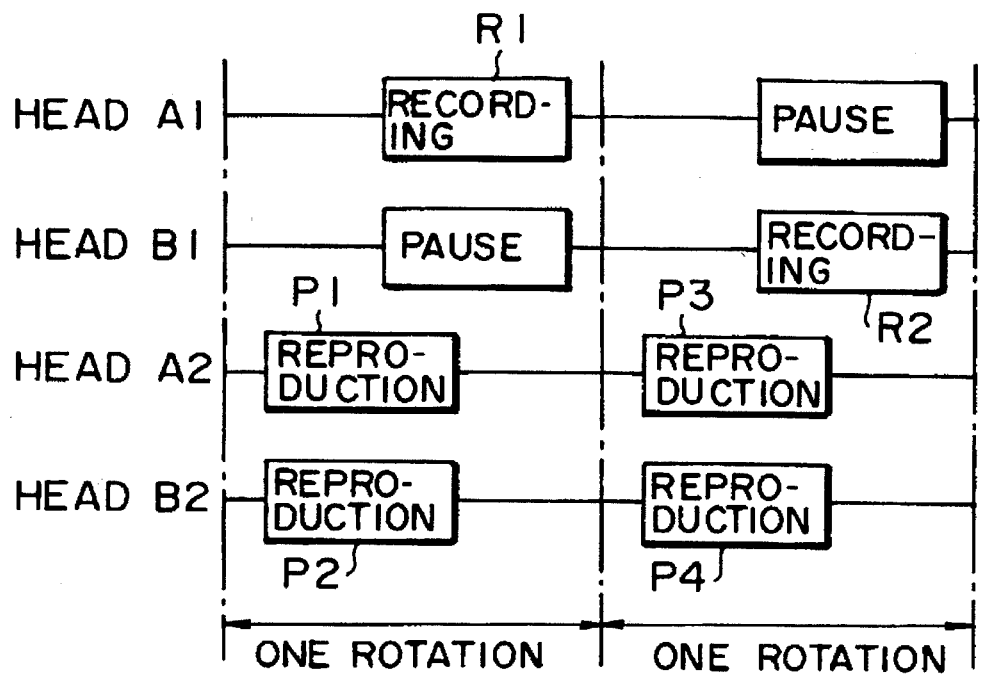
FIG. 9 is a timing chart of a recording operation by rotating heads A1 and B1 and a reproducing operation by rotating heads A2 and B2.

FIG. 9 shows recording timings. In the period during which the rotating head drum 11 makes the first rotation, the magnetic heads A2 and B2 first reproduce two adjacent tracks at timings P1 and P2 at which the magnetic tape T is scanned. However, when starting recording, the portion where there is no recording track or the portion on which is previously recorded a file is reproduced.

As shown in FIG. 9, recording for one track is performed by the magnetic head A1 at a timing R1 at which the magnetic tape T is scanned. At this time, recording is not performed by another magnetic head B1 at the timing R1 at which the magnetic tape T is scanned.

In the period during which the rotating head drum 11 makes the next rotation, as shown in FIG. 9, the two adjacent tracks are reproduced by the magnetic heads A2 and B2 at timings P3 and P4 at which the magnetic tape T is scanned. As shown in FIG. 9, recording for one track is performed by the magnetic head B1 at a timing R2 at which the magnetic tape T is scanned. Another recording magnetic head A1 does not perform recording at the timing R2 at which the magnetic tape T is scanned as shown in FIG. 9.

Each time the rotating head drum 11 makes one rotation, recording is performed in each track. Since the magnetic heads A1 and B1 having different azimuth angles are alternately used for recording, a track of one recording azimuth angle and a track of another recording azimuth angle are alternately formed. Since reproduction is performed by the magnetic heads A2 and B2 while recording is performed by the magnetic heads A1 and B1, the recorded signals are immediately reproduced.

In this embodiment, as shown in FIG. 8, since the tracks scanned by the magnetic heads A2 and B2 are tracks delayed by 6 tracks from the tracks scanned by the magnetic heads A1 and B1, the signals recorded by the magnetic heads A1 and B1 are reproduced by the magnetic heads A2 and B2 at the time after the recording has proceeded for 6 tracks from when the recording has started. Thereafter, recordings signals are reproduced delayed from each other by 6 tracks. What is commonly called a check-after-write operation is performed by the above-mentioned reproduction signals.

The reproduced data detected from the reproduction signals during the recording is supplied to the data processing circuit 13 where error detection is performed for each block by using a correcting code contained in the reproduced data. When an error is detected, data of the track number and the block number, which are address data of the block at which the recording error has occurred, are transmitted from the data processing circuit 13 through the interface 12 to the data converter 30. The data converter 30 stores the address data of the place where the recording error has occurred.

When the recording of data for one block supplied from the host computer 40 terminates, the data converter 30 sends a request signal to the host computer 40 so that data of the place where the recording error has occurred is transmitted again from the host computer. In accordance with this request signal, data output from the host computer 40 is transmitted to the data streamer 10 via the data converter 30, and is recorded on the magnetic tape again. As shown in FIG. 9, the recorded signals are reproduced immediately afterward in order to check if there is a recording error. When a recording error is detected, recording of the same data is repeated.

Figure 10:
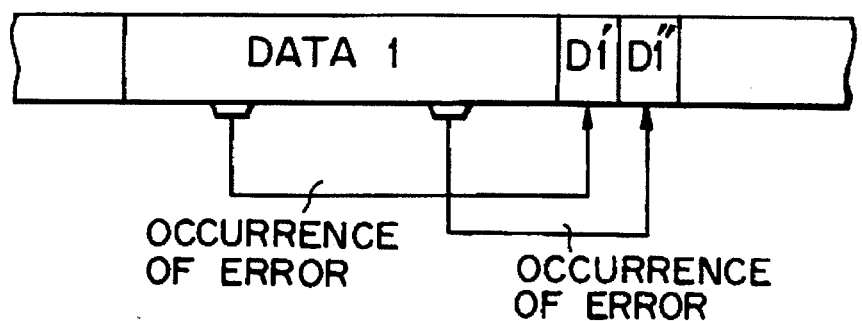
FIG. 10 is a schematic view illustrating recording on tape by the rotating magnetic head.

When, for example, data D1 in one unit is recorded at a predetermined place of the magnetic tape as shown in FIG. 10, data of that portion of the recorded data D1 where the recording error has occurred is recorded again as data D1' or D1" following the portion where the data D1 is recorded. In a case where the amount of data of data D1' or D1" recorded again is small, not only the data of the block at which the recording error has occurred, but also the data in the vicinity of that data is recorded again so that data D1' and D1" become data formed of at least about several tracks.

Once the above-described recording operation is performed, data supplied to the data streamer 10 is surely recorded on the magnetic tape, and data can be surely stored. Further, in the present invention, since only error detection using a correcting code is performed for signals reproduced after recording, it is possible to easily determine the presence or absence of a recording error without verifying the recorded data with the reproduced data, and thus recording can be performed surely by a circuit which is simple in construction.

As shown in FIG. 10, data of the place at which a recording error has occurred is recorded at another portion of the magnetic tape. During reproduction time, it is possible to reproduce as continuous data in one unit by coping with control of the portion where data is to be reproduced under the control of the data converter 30 or the host computer 40.

Figure 11:
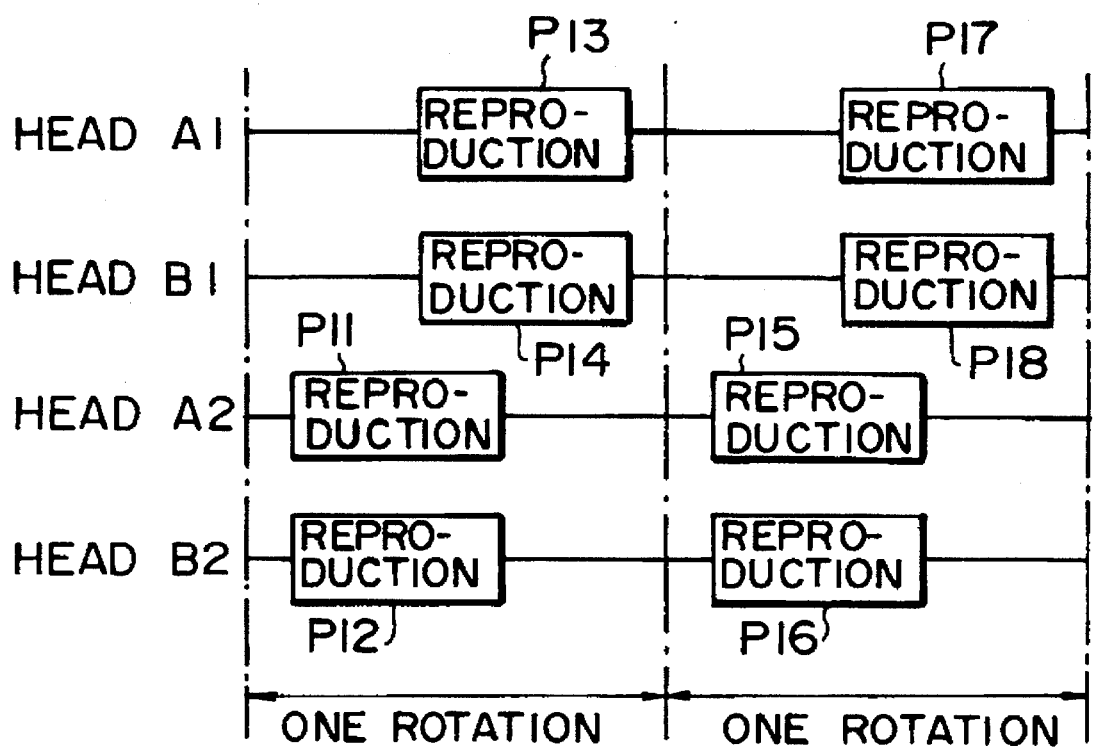
FIG. 11 is a timing chart of a reproducing operation by the rotating heads A1 and B1 and a reproducing operation by the rotating heads A2 and B2.

With reference to FIG. 11, a description will now be given of an operation in a case where recorded data is reproduced from a magnetic tape by using a data streamer of this embodiment and supplied to the host computer 40.

FIG. 11 shows reproduction timings in this embodiment. In the period during which the rotating head drum 11 makes one rotation at the first time, the magnetic heads A2 and B2 first reproduce two adjacent tracks at timings P11 and P12 at which the magnetic tape T is scanned.

Further, as shown in FIG. 11, two adjacent tracks are reproduced at timings P13 and P14 at which the magnetic heads A1 and B1 scan the magnetic tape T. Timings P13 and P14 precede by 6 tracks the tracks reproduced at timings P11 and P12.

Also in the period during which the rotating head drum 11 makes the next rotation, in a similar manner, two adjacent tracks are reproduced at timings P15 and P16 at which the magnetic tape T is reproduced by the magnetic heads A2 and B2. Then, as shown in FIG. 11, two adjacent tracks are reproduced at timings P17 and P18 at which the magnetic tape T is scanned by the magnetic heads A1 and B1.

Thereafter, reproduction using all the four heads A1, A2, B1 and B2 is repeatedly performed for each rotation. The reproduced data detected from reproduced RF signals is written in the data memory 14 connected to the data processing circuit 13.

Figure 12:
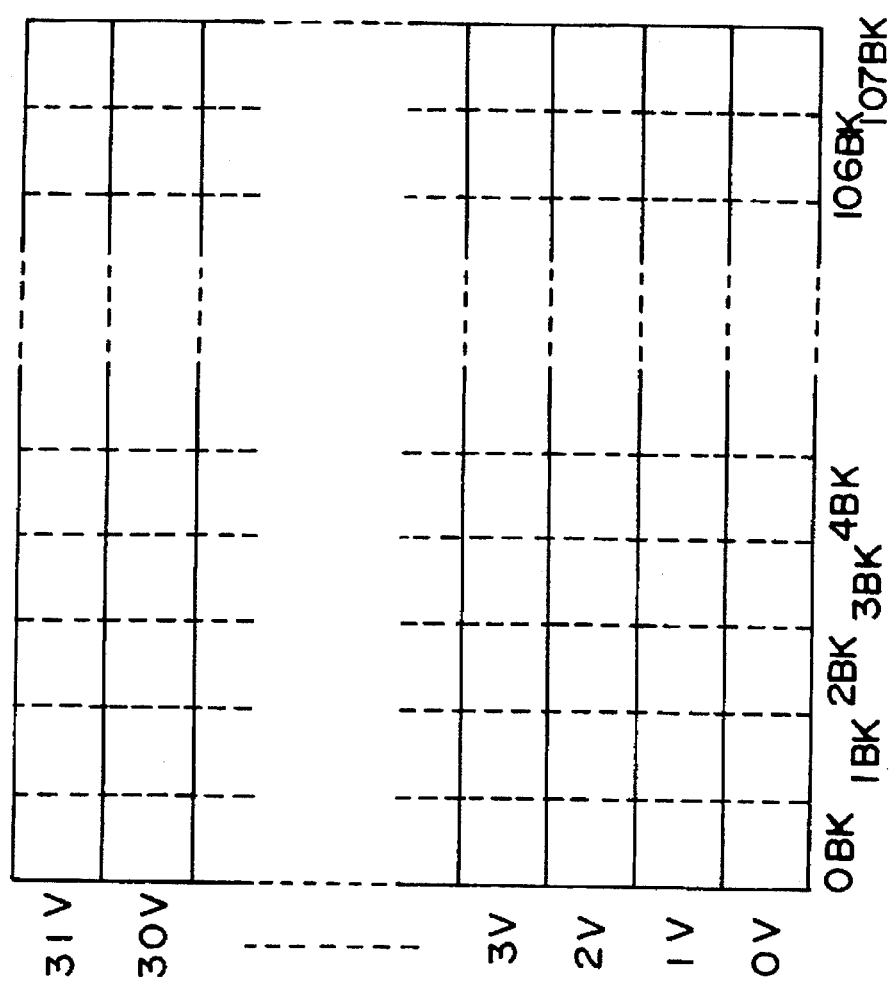
FIG. 12 is a schematic view of a memory for temporarily storing data reproduced from a tape.

The structure of the data memory 14 will now be described. A recording area for 32 tracks of 0V to 31V is provided for the memory 14 of this embodiment, as shown in FIG. 12. After writing by starting in sequence at the area of track number 0V to the area of track number 31V is completed, writing is performed again starting at the area of track number 0V, and thus the storage area of the 32 tracks is cyclically used. An area of 0 BK to 107 BK is set in an area for one track in correspondence with 108 blocks.

When, for example, a recording signal of track number 2V is reproduced by the magnetic head A1 at a predetermined timing, the reproduced data at this time is stored at the position of the corresponding block within the area of the track number 2V. If, for example, it is data of block number 3, the data is stored in the area of block number 3 BK at track number 2V.

In the track reproduced by the magnetic head A2 at the above-mentioned timing, recording signals of track number 8V delayed by 6 tracks are formed, and this data reproduced therefrom is stored at the corresponding block within the area of track number 8V. Even in a case where data reproduced by the magnetic head A1 has already been stored in the area of track number 8V, data reproduced by the magnetic head A2 is written to update the stored data.

Figure 1:
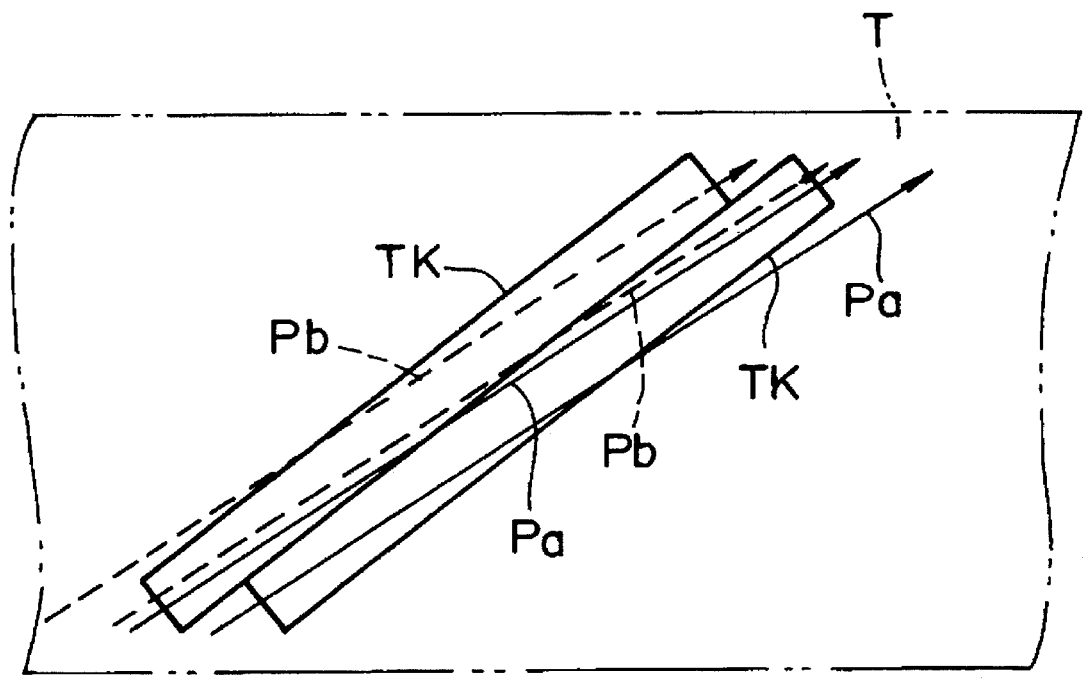
FIG. 1 shows a trace path of a head with respect to the tracks TK on the tape T in a non-tracking method.
Figure 2:
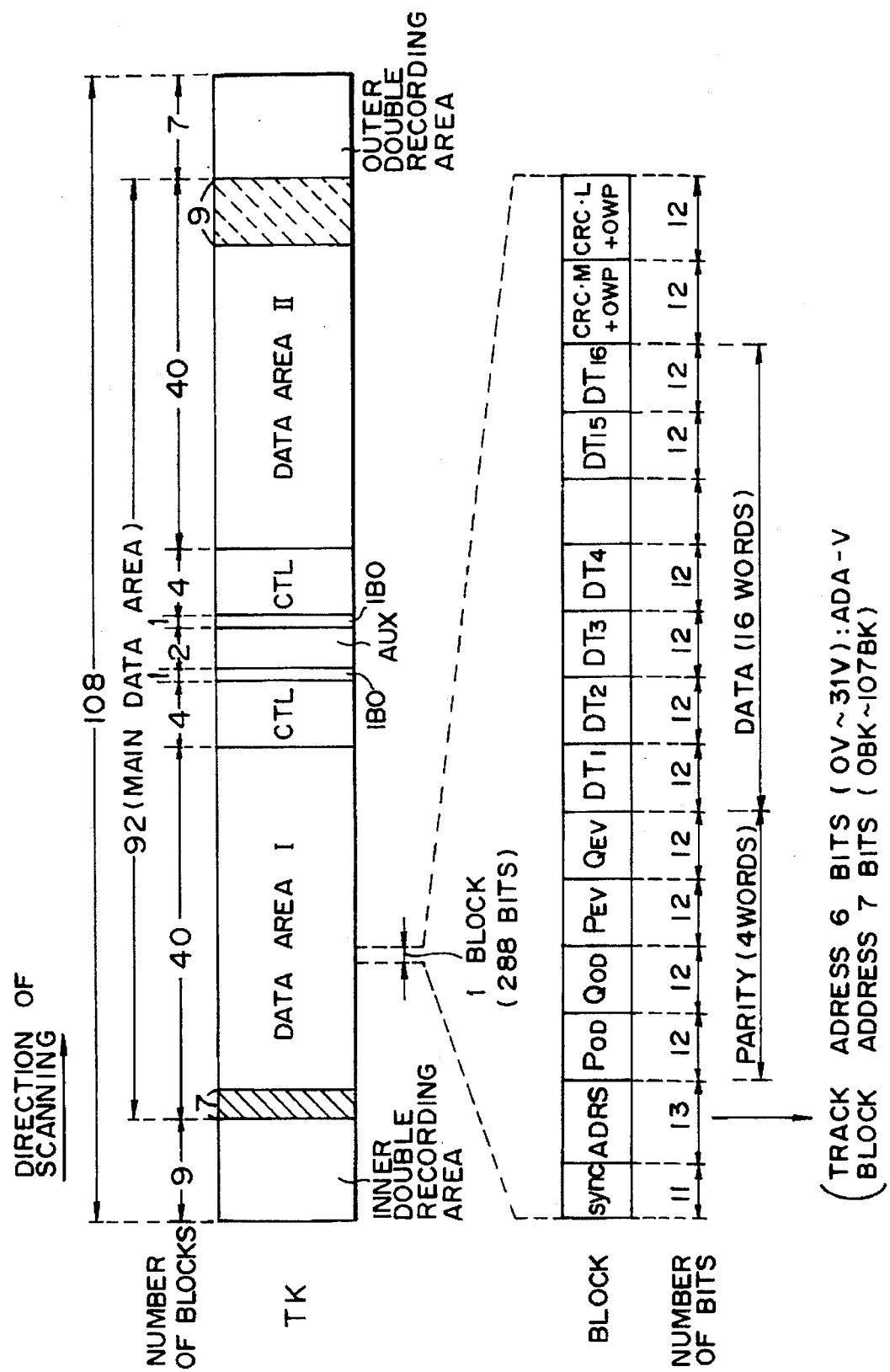
FIG. 2 shows the structure of data recorded on the tracks TK formed on the tape T and the structure of one block of data recorded on the tracks TK formed on the tape T.

As explained with reference to FIG. 2, a track address (track number) and a block address (block number) are recorded in each block. That is, the track address and the block address become the writing address of the reproduced block in the memory area of FIG. 12. Therefore, even if each block is reproduced in any sequence, each block is input onto the memory 14, and when each of the blocks that make up one track is stored, the blocks are read out from the memory 14. Thus, the blocks are rearranged in a correct sequence.

During recording also, data is temporarily written in the data memory 14 in units of tracks. At this time, each track is assigned with a certain track address (ADA-V) from 0V to 31V and stored. That is, 0V to 31V is a writing address at which data is written in the data memory 14 in units of tracks.

This writing address is incremented for each data in units of tracks, and the data memory 14 is used in a ring form. The data is read out in sequence according to the readout address (REC-V) and supplied to the magnetic heads A1 and B1. The track address and the block address to be recorded in the track are assigned so as to correspond to the address within the data memory 14.

Figure 13:
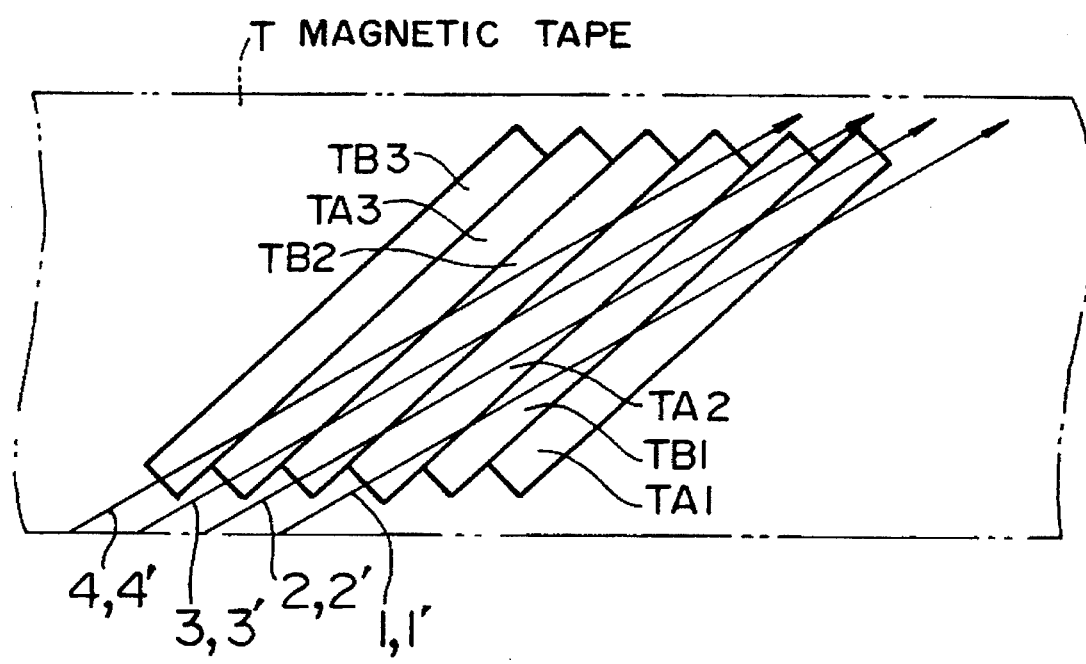
FIG. 13 is a schematic view illustrating tracing by each head during reproduction.

Since a reproduction operation is performed as shown in FIG. 13, data recorded in each track of the magnetic tape is reproduced at a density four times as great as that during recording, and the scanning density of the reproducing head during reproduction is sufficiently high. Thus, it is possible to completely reproduce data recorded on the magnetic tape.

An example of the actually reproduced state will now be described with reference to FIG. 13. Tracks on which data is recorded as tracks TA1, TB1, TA2, TB2, . . . are formed on the magnetic tape T. In this case, tracks TA1, TB1, TA2, TB2, . . . are assumed to be recording azimuth angles at which data can be reproduced by the magnetic heads A1 and A2, and tracks TA1, TB1, TA2, TB2, . . . are assumed to be recording azimuth angles at which data can be reproduced by the magnetic heads B1 and B2.

The track TA2 having the recording azimuth angle at which data can be reproduced by the magnetic heads A1 and A2 is noted and described.

It is assumed that at first the magnetic head A1 scans the tape as indicated by path 1, and then after one rotation of the drum the magnetic head A1 scans the tape as indicated by path 2. Thereafter, the magnetic head A1 scans the tape as indicated by tracks 3, 4, . . . after each rotation. At this time, each of the paths 1, 2, 3 and 4 is displaced by the pitch of one track.

It is assumed that after the drum makes six rotations after the magnetic head A1 at first scans the tape as indicated by path 1, the magnetic head A2 scans in accordance with path 1' which is nearly the same as path 1, and then the magnetic head A2 scans in accordance with path 2' on the tape after the drum makes one rotation. Thereafter, the magnetic head A2 scans in accordance with tracks 3', 4', . . . after each rotation of the drum. It is supposed that the paths 1 to 4, and 1' to 4' are inclined slightly with respect to the tracks as shown in FIG. 13.

When such scanning is performed, RF signals shown in FIGS. 14A, 14B, 14C and 14D are reproduced during the scanning of each of the paths 1, 2, 3 and 4.

That is, as shown in FIG. 14A, a small amount of signals of track TA2 are reproduced at the initial period of scanning of path 1, and the signals of track TA1 are reproduced in the remaining period. As shown in FIG. 14B, signals of track TA2 are reproduced at the initial period of scanning of path 2, and a small amount of the signals of track TA1 are reproduced in the latter half of the period. As shown in FIG. 14C, a small amount of signals of track TA3 are reproduced at the initial period of scanning of path 3, and the signals of track TA2 are reproduced in the remaining period. Further, as shown in FIG. 14D, signals of track TA3 are reproduced at the initial period of scanning of path 4, and a small amount of the signals of track TA2 are reproduced in the latter half of the period.

In practice, as described with reference to FIG. 2, data which forms one track is divided into 108 blocks. However, for simplicity of description, the data reproduced state will be described assuming that one track=24 blocks.

The block numbers of data of track TA2 detected during the scanning of path 1 are block numbers 1 to 5 as shown in FIG. 14E. The block numbers of data of track TA2 detected during the scanning of path 2 are block numbers 4 to 13 as shown in FIG. 14F. The block numbers of data of track TA2 detected during the scanning of path 3 are block numbers 12 to 19 as shown in FIG. 14G. The block numbers of data of track TA2 detected during the scanning of path 4 are block numbers 21 to 24 as shown in FIG. 14H.

It is assumed that during the scanning of path 2, data of block number 7 is omitted due to an occurrence of a reproduction error as shown in FIG. 14F, and data of block number 20 is not reproduced during any scanning as shown in FIGS. 14G and 14H.

As regards the state in which data of each block is stored in the storage area of track TA2 of the data memory 14 connected to the data processing circuit 13, as data which is reproduced at first by the scanning of path 1, as shown in FIG. 14I, data of block numbers 1 to 5 is stored.

Thereafter, as a result of writing data of the block number reproduced as the scanning proceeds, data of each block number becomes available in sequence as shown in FIGS. 14J, 14H and 14L. When the scanning of path 1 to path 4 terminates, data of block numbers 7 and 20 is omitted, as shown in FIG. 14L.

In this embodiment, scanning of paths 1', 2', 3' and 4' which are nearly the same as paths 1, 2, 3 and 4 shown in FIG. 13 is performed again by the magnetic head A2. Data of block numbers 7 and 20 is reproduced during the scanning of the paths 1', 2', 3' and 4', and data of all the blocks that make up track TA2 is eventually obtained, as shown in FIG. 14M.

The setting of track address ADA-V (=the writing address of writing in the data memory 14) in this embodiment described above will be described below.

During recording, as described above, the writing address ADA-V is incremented in the data memory 14 at the cycle of one track unit (one rotation of the drum), and track data is written in the data memory 14. The track data is read out in sequence according to the readout address REC-V and supplied to the magnetic heads A1 and B1 whereby the data is recorded on the magnetic tape.

Figure 15:
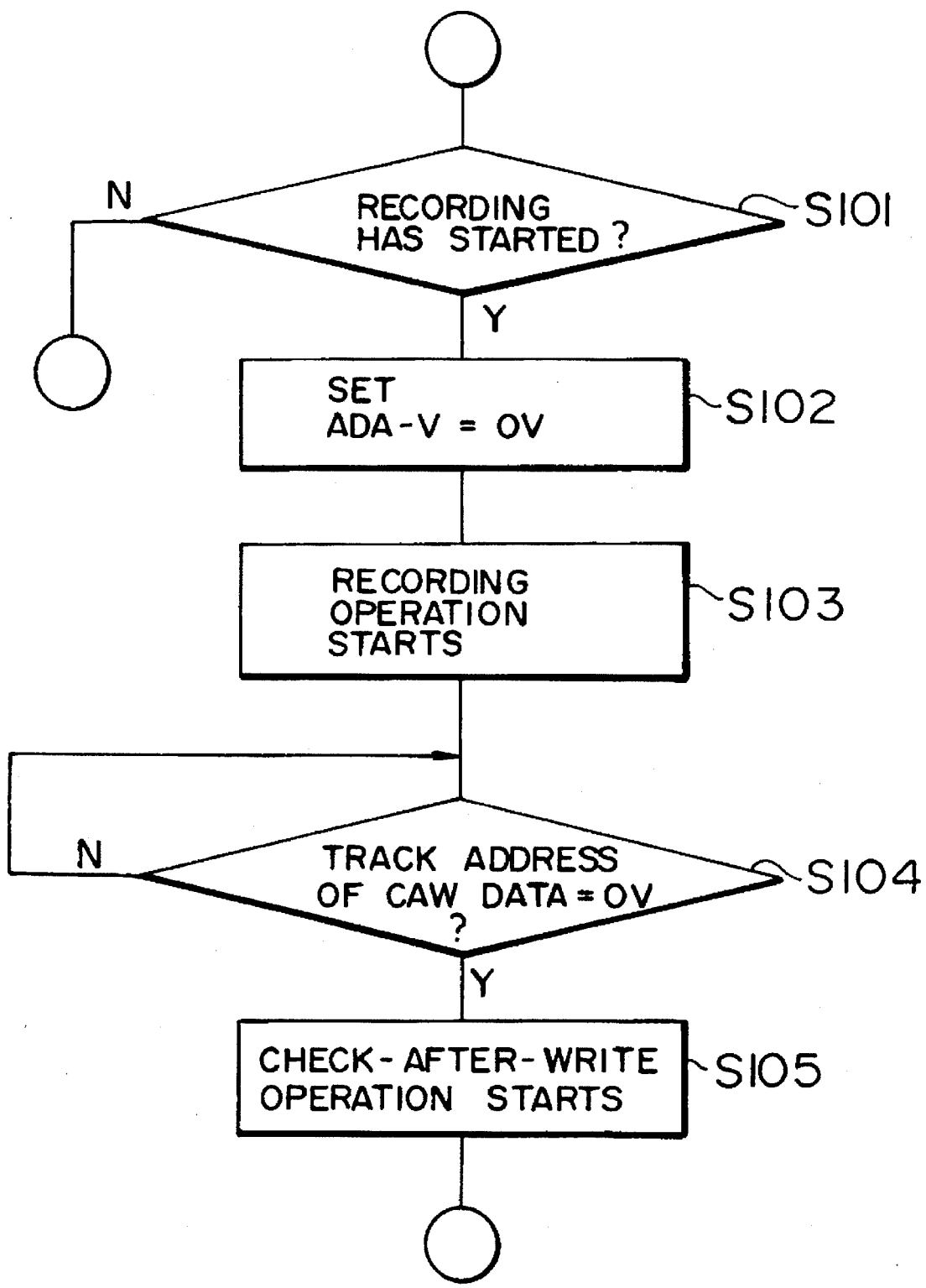
FIG. 15 is a flowchart of recording.

In this embodiment, control shown in FIG. 15 is effected for the writing address ADA-V and the above-described check-after-write operation during recording.

Figure 16A:
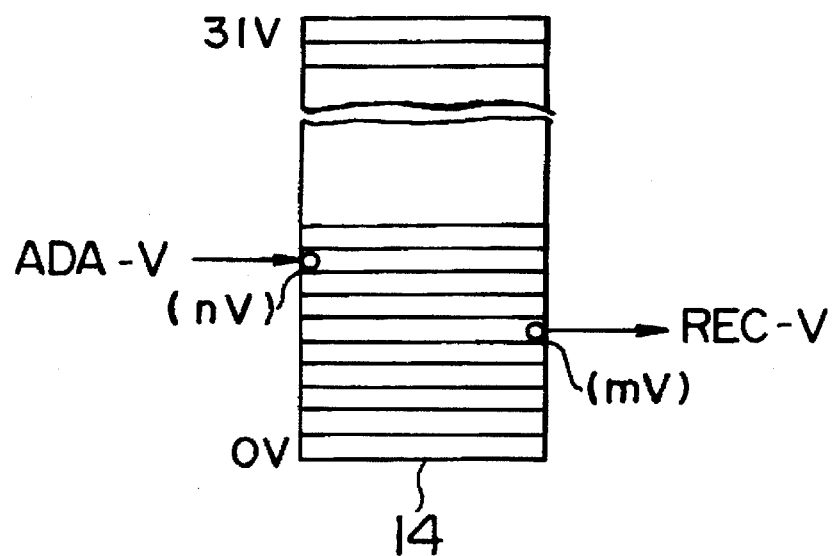
FIG. 16A is an illustration of track address setting during recording.
Figure 16B:
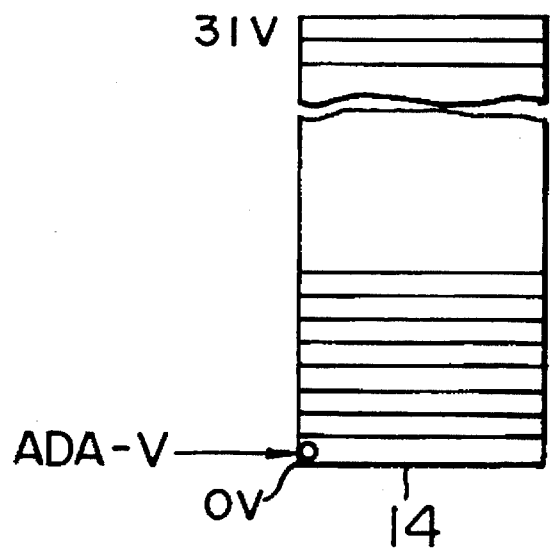
FIG. 16B is an illustration of an operation for resetting a track address during recording.

In step S101, a recording operation is started when data is supplied to the data streamer 10 from the host computer 40. In step S102, the writing address ADA-V is forced to be set at 0V. For example, even if the writing address ADA-V is nV as shown in FIG. 16A, the pointer is shifted to the position of writing address ADA-V=0V as shown in FIG. 16B. The recording operation is started from that position (step S103). That is, data in units of tracks is stored in the data memory 14 in sequence starting at the area of 0V, and is read out according to readout address REC-V and supplied to the magnetic heads A1 and B1 whereby the data is recorded on the magnetic tape.

At this point, track data is reproduced from the magnetic tape by the magnetic heads A2 and B2 during recording, and a check-after-write operation is performed as described above. In this embodiment, however, an operation for controlling track address ADA-V recorded in the reproduced block data is performed (S104).

Waiting is done until the block whose track address ADA-V=0V is reproduced. When the data of the block whose track address ADA-V=0V is reproduced, the check-after-write operation is started (S105).

The above operation will be described with reference to FIGS. 17A and 17B.

Figure 17A:
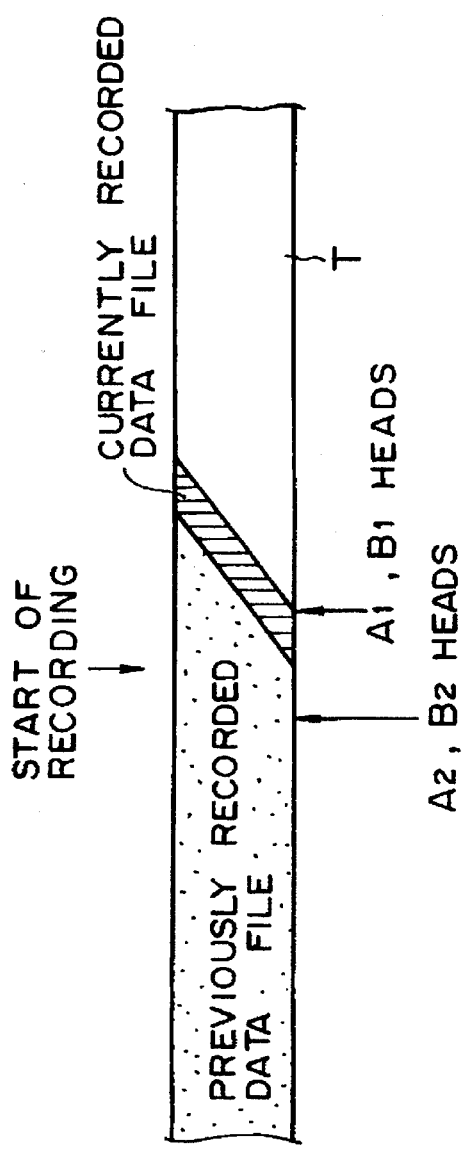
FIG. 17A is a schematic view of a tape in a case where there is a previously recorded data file on the tape and a new data file is overwritten thereon.
Figure 17B:
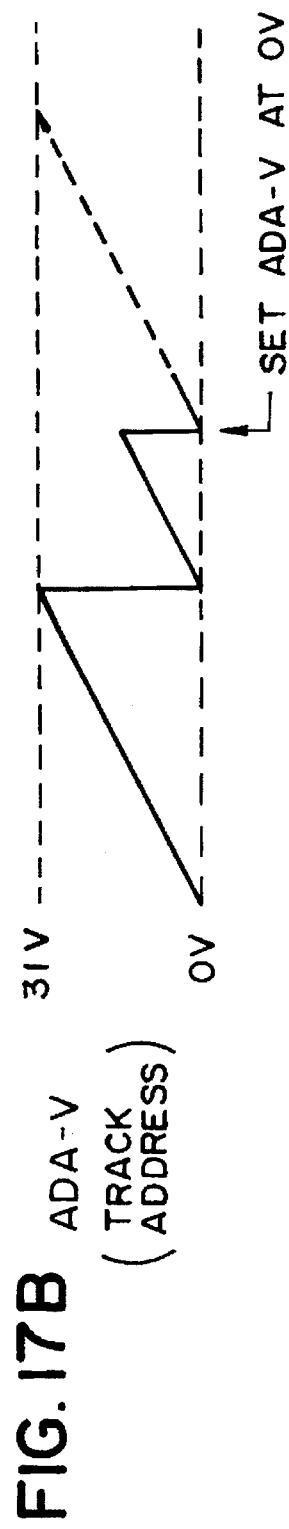
FIG. 17B is a status transition view of a track address recorded on a tape.

Since the track address ADA-V of the first track on recording starting time is set at 0V, when the current recording is started from the recording start position of FIG. 17A, the track address ADA-V shown in the block within each track recorded in the magnetic tape is as shown in FIG. 17B. That is, the track address ADA-V of the leading track on which the current recording is performed is set at 0V, and thereafter the track address ADA-V is set at 1V, 2V, 3V, . . . , 31V, 1V.

At this point, when recording by the magnetic heads A1 and B1 has started, the magnetic heads A2 and B2 which trace with a track difference of 6 tracks at first trace the tracks of a previous data file. Since this is not tracing of tracks recorded by the magnetic heads A1 and B1 in the recording operation for this time, data read by the magnetic heads A2 and B2 is not necessary for checking data.

Therefore, the track address ADA-V recorded in the block data reproduced by the magnetic heads A1 and B1 is confirmed, and waiting is done until this address reaches 0V. The block whose track address ADA-V=0V is data of the first track on which the recording operation of this time is performed. Therefore, since the check-after-write operation is started at the time data of the block whose-track address ADA-V=0V is reproduced, a useless check operation as is done before can be eliminated, and thus consumption of electric power by a useless operation can be prevented, and an improper check operation need not to be executed.

Although in this embodiment the leading track address at which the recording operation is performed is set at 0V, this need not be 0V, and a prescribed value from 0 to 31 may be set.

In any case, when the number of tracks which can be recorded is from track 0 to track n because of the capacity of the data memory 14, any one of values from 0 to n may be preselected and set as the fixed value to be set.

Next, an operation to be performed during reproduction in this embodiment, in particular, an operation for determining valid data by using an OWP code will be described.

As described with reference to FIGS. 4A to 4F, when a series of data files are recorded on the magnetic tape T, an OWP code is added, for example, the OWP code is recorded as $OWP_x$ in each block for the tracks which form file X as shown in FIG. 18a. For the tracks which form file Y, the OWP code is recorded as $OWP_y$ in each block.

It is assumed that data file Z having the OWP code of $OWP_z$ is overwritten at the tape position, an unerased portion occurs at this time due to some reason, such as the clogging of the head, and data of the previous file X is left partially as indicated by the shaded portion REC-ER in FIG. 18B.

When such a file Z is reproduced, data to be read out include unerased data $D_x$ which forms file X in the middle of data $D_z$ which forms file Z as shown in FIG. 18C. The OWP code to be read out becomes $OWP_x$ in the unerased portion as shown in FIG. 18D.

Therefore, as described with reference to FIGS. 4A to 4F, in the reproduction of file Z, data of the previously unerased file X is regarded as valid data, and normal data of file Z may be omitted.

Figure 19:
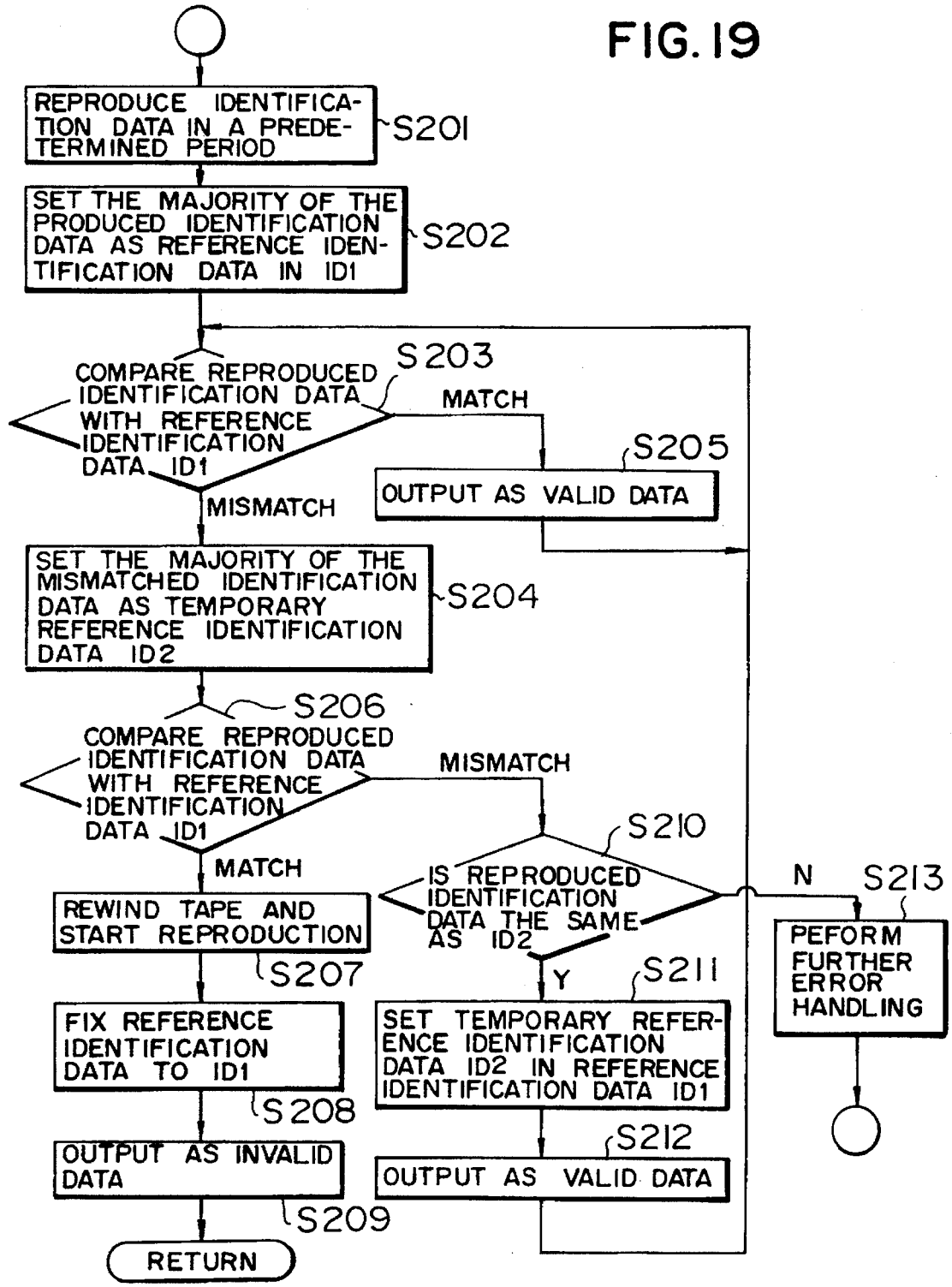
FIG. 19 is a flowchart of a reproducing operation.

Therefore, in the present invention, an operation shown in FIG. 19 is performed during reproduction.

As shown in step S201 of FIG. 19, a reproducing operation is started in accordance with a reproducing operation command: data is reproduced in a predetermined period, and OWP which is identification data is input.

In step S202, the majority of identification data from among the input OWPx is set as a reference OWP in a register ID1. For example, as shown in FIG. 18B, the reference OWP for the file Z is $OWP_z$.

Thereafter, in step S203, the reproduced identification data is compared with the reference OWP which is reference identification data for each block or each track.

In step S204, when the reproduced identification data does not match the reference OWP which is reference identification data, a majority decision is made from among the reproduced identification data, and the majority of identification data is set in a register ID2 as a temporary reference OWP., In step S205, when the reproduced identification data matches the reference OWP which is reference identification data, the data is output as valid data.

In step S206, identification data which is reproduced thereafter is input further, and the data is compared with the reference OWP which is reference identification data set in register ID1.

As shown in FIG. 18B, the shaded portion indicated by REC-ER corresponds to a section in which the above-mentioned defective recording data is recorded.

In the determination of step S206, identification data to be reproduced is input further. When the identification data matches the above-mentioned ID1, the section in which the above-mentioned temporary reference data is set is determined to be a section in which defective recording data is recorded.

In step S207, the magnetic tape is rewound to the section in which the defective recording data is recorded, and reproduction is started again.

In step S208, the reference identification code which is recorded in the register ID1 is fixed. In step S209, the reference identification code is compared with identification data reproduced from the section in which the defective recording data is recorded; since, of course, they do not match each other, the data is output as error (invalid) data.

When the reproduced identification data does not match the reference identification data ID1 in step S206, the identification data reproduced in step S210 is compared with the contents of register ID2; when they match each other, the section in which the above-mentioned defective recording data is recorded is determined not to be defective recording data, but to be a new data file.

In step S211, the temporary reference identification data stored in the register ID2 is fixed as reference identification data, and ID1 is replaced with the temporary reference identification data stored in the register ID2.

In step S212, assuming the temporary reference identification data to be valid data, a new data file is output.

In step S209, the reproduced identification data is compared with the contents of the register ID2. If they do not match each other, assuming that new defective recording data is present, this data is output as invalid data in step S213.

That is, in the example of FIG. 18E, the unerased portion REC-ER is reproduced; if defective recording data is detected, the reference OWP value is fixed to $OWP_z$ when the magnetic tape is rewound to a certain extent. Then, a reproducing operation is performed again from the rewound position. As shown in FIG. 18F, the reproduced data of the unerased portion REC-ER is determined to be invalid data since OWP data is $OWP_x$ and becomes valid data because the OWP data is $OWP_z$ from the position after the unerased portion REC-ER, and data of file Z is incorrectly recognized as invalid data. Thus, there is no possibility that the data is omitted.

With this operation, even if an unerased portion occurs during recording, data can be output properly, and the reliability can be improved. For data of file Z which is not recorded in the unerased portion, a recording error is confirmed in response to the check-after-write operation during recording, and the data which is not recorded is recorded at another position as described in FIG. 10. Thus, it is possible to read out and output all the data of file Z during reproduction.

Although this embodiment is applied to a data streamer for recording and reproducing data for use with a computer, the present invention may be applied as a recording and reproducing apparatus for recording and reproducing other data, such as audio signals.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A recording apparatus, comprising:

recording means for forming a plurality of tracks made up of a plurality of blocks on a magnetic recording medium in which predetermined data is recorded in each block and for recording a track number and a block number for each of the plurality of blocks within the track;

reproducing means for reading data from the track formed by said recording means while a recording operation is being performed by said recording means;

recording operation determination means for determining whether data has been recorded correctly by said recording means on the basis of the data read by said reproducing means; and control means for effecting control so that the track number of the track at which recording is started by said recording means is set at a fixed value before a recording operation is started, and for controlling said recording operation determination means so that a determination operation by said recording operation determination means is started when it is determined that the track on which the data reproduced by said reproducing means is the track having said fixed value.

2. A recording apparatus, comprising:

a recording head for forming a plurality of tracks made up of a plurality of blocks on a magnetic tape and for recording predetermined data in each of the plurality of blocks, and for recording a track number and block number for each of the plurality of blocks within the track;

a reproducing head for reading data from the track formed by said recording means while a recording operation is being performed by said recording head;

an error checker for determining whether the data has been recorded correctly by said recording head on the basis of the data read by said reproducing head; and a controller for effecting control so that the track number of the track on which recording is started by said recording head is set at a fixed value before a recording operation is started, and for controlling said error checker so that a check operation by said error checker is started when it is determined that the track on which the data reproduced by said reproducing head is the track having said fixed value.

3. A recording method employed in a recording apparatus in which a plurality of tracks made up of a plurality of blocks are formed in a magnetic recording medium, predetermined data being recorded in each block, a track number and a block number for each block within the track are recorded, data of the track formed by said recording head being read by a reproducing head, and the predetermined data being checked, said recording method comprising steps of:

setting the track number of the track on which recording starts at a predetermined fixed value and starting a recording operation;

first determining that the track on which data reproduced by the reproducing head is set at said predetermined fixed value has been reproduced; and second determining whether or not data has been recorded correctly when it is determined in said first determining step that the track which is set at said predetermined fixed value has been reproduced.

4. A reproducing apparatus in which a plurality of tracks each made up of a plurality of blocks are formed in a magnetic recording medium, predetermined data being recorded in each blocks, and in which identification data is recorded additionally in each block of said track, said reproducing apparatus comprising:

reference identification data setting means for setting as reference data a majority decision of identification data read out from each of said blocks during a predetermined period when the magnetic recording medium is reproduced;

comparing means for comparing reference data set by said reference identification data setting means with identification data of each block reproduced thereafter;

temporary reference identification data setting means for temporarily setting said identification data as the reference identification data when it is determined by said comparing means that the reference identification data does not match the majority of identification data of each block reproduced during a predetermined period;

determination means for determining that the majority of identification data reproduced has returned to the previous reference identification data after said reference identification data is temporarily set; and control means for effecting control so the reference identification signal temporarily set by said temporary reference identification data setting means is nullified when it is determined by said determination means that the majority of identification data reproduced after the reference identification data is changed has returned to a previous reference identification data.

5. A reproducing apparatus according to claim 4, wherein the reference identification data temporarily set by said temporary reference identification data setting means is nullified by replacement with said previous reference identification data by said control means.

6. A reproducing apparatus according to claim 5, wherein the reference identification data temporarily set by said temporary reference identification data setting is replaced with said previous reference identification data by said control means, the recording medium is rewound to the block at which the majority of identification data is determined to be mismatched by said comparing means, the identification data of the block at which the majority of said identification data is determined to be mismatched is recorded again, and the identification data is compared with said previous replaced reference identification data, and if they do not match each other, the data is output as error data.

7. A reproducing apparatus according to claim 4, wherein, after the reference identification data temporarily set by said temporary reference identification data setting is controlled to be nullified by said control means, the recording medium is rewound to the block at which the majority of identification data is determined to be mismatched by said comparing means, and the block at which the majority of identification data is determined to be mismatched by said comparing means is output as error data.

8. A reproducing apparatus according to claim 4, wherein when it is determined by said comparing means that the reference identification data matches the majority of identification data of each block reproduced during a predetermined period, the blocks related to said identification data are output as valid data.

9. A reproducing method in which a plurality of tracks each made up of a plurality of blocks are formed in a magnetic recording medium and predetermined data is recorded in each block, and in which the magnetic recording medium in which identification data is recorded, said reproducing method comprising steps of:

setting a reference identification data by setting a majority of identification data read out from each of said blocks as reference identification data in a predetermined period when the magnetic recording medium is reproduced;

comparing said set reference identification data with the identification data of each block which is reproduced thereafter;

setting a temporary reference identification data by temporarily setting said majority identification data as identification data when it is determined in said comparing step that said identification data do not match the majority of identification data of each block reproduced in the predetermined period;

determining if the majority of reproduced identification data has returned to the previous identification data after reference identification data is temporarily set in said temporary reference identification data setting step; and controlling the reference identification signal which is temporarily set by said temporary reference identification data setting means to be nullified when it is determined in said determining step that the majority of identification data reproduced after the reference identification data is changed has returned to the previous reference identification data.

10. A reproducing method according claim 9, wherein the step of controlling the reference identification signal to be nullified includes replacing the reference identification signal which is temporarily set by said identification data temporary setting means with said previous identification data.

11. A reproducing method according to claim 10, wherein said step of controlling said reference identification signal to be nullified further comprises:

replacing the reference identification signal which is temporarily set by said reference identification data temporary setting means with said previous reference identification data;

rewinding the recording medium to the block at which the majority of identification data is determined to be mismatched by said comparing means; and reading again the identification data of the block at which the majority of said identification data with said previous replaced reference identification data, and outputting the identification data as error data if they do not match each other.

12. A reproducing method according to claim 9, wherein said step of controlling said reference identification signal to be nullified further comprises: rewinding the recording medium to the block at which the majority of identification data is determined to be mismatched by said comparing means after the reference identification signal which is temporarily set by said temporary reference identification data setting means is controlled to be nullified; and outputting the block at which the majority of identification data is determined to be mismatched by said comparing means as error data.

13. A reproducing method according to claim 9, further comprising a step of outputting a block related to said identification data as valid data when it is determined in said comparing step that the reference identification data matches the majority of identification data of each block reproduced during the predetermined period.

* * * * *